(12) United States Patent
Karaoguz et al.

(10) Patent No.: US 8,630,225 B2
(45) Date of Patent: Jan. 14, 2014

(54) OVER THE AIR PROGRAMMING VIA A BROADBAND ACCESS GATEWAY

(75) Inventors: Jeyhan Karaoguz, Irvine, CA (US); Marc Abrams, Aliso Viejo, CA (US); Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1874 days.

(21) Appl. No.: 11/096,052

(22) Filed: Mar. 30, 2005

(65) Prior Publication Data

US 2005/0233693 A1 Oct. 20, 2005

Related U.S. Application Data

(60) Provisional application No. 60/563,894, filed on Apr. 16, 2004.

(51) Int. Cl.
*H04W 4/00* (2009.01)

(52) U.S. Cl.
USPC ........ 370/328; 455/460; 455/422.1; 455/418; 455/419

(58) Field of Classification Search
USPC ............... 370/328; 455/460, 422.1, 418, 419
See application file for complete search history.

(56) References Cited

U.S. PATENT DOCUMENTS

| | | | | |
|---|---|---|---|---|
| 5,822,012 A * | 10/1998 | Jeon et al. | ...................... | 348/553 |
| 6,006,106 A * | 12/1999 | Cook et al. | .................. | 455/552.1 |
| 6,233,463 B1 * | 5/2001 | Wiedeman et al. | ........ | 455/552.1 |
| 6,275,863 B1 * | 8/2001 | Leff et al. | ...................... | 709/248 |
| 6,434,159 B1 * | 8/2002 | Woodward et al. | ........... | 370/401 |
| 6,526,581 B1 * | 2/2003 | Edson | .............................. | 725/74 |
| 6,539,382 B1 * | 3/2003 | Byrne et al. | ................... | 711/118 |
| 6,577,628 B1 * | 6/2003 | Hejza | .............................. | 370/392 |
| 6,738,616 B1 * | 5/2004 | Link et al. | ...................... | 455/417 |
| 6,751,441 B1 * | 6/2004 | Murray et al. | ..................... | 455/7 |
| 6,792,323 B2 * | 9/2004 | Krzyzanowski et al. | ....... | 700/90 |
| 6,795,404 B2 * | 9/2004 | Slemmer et al. | .............. | 370/270 |
| 6,826,166 B2 * | 11/2004 | Yokoyama | .................... | 370/338 |
| 6,977,909 B2 * | 12/2005 | Minborg | ....................... | 370/260 |
| 6,999,432 B2 * | 2/2006 | Zhang et al. | .................. | 370/328 |
| 7,061,884 B2 * | 6/2006 | Shepherd et al. | ............. | 370/328 |
| 7,065,778 B1 * | 6/2006 | Lu | ................................... | 725/98 |
| 7,096,011 B2 * | 8/2006 | Kanazawa et al. | ............ | 455/421 |
| 7,116,938 B2 * | 10/2006 | Monroe et al. | ............... | 455/41.2 |
| 7,120,139 B1 * | 10/2006 | Kung et al. | .................... | 370/352 |
| 7,149,474 B1 * | 12/2006 | Mikhak | ......................... | 455/41.2 |
| 7,194,251 B2 * | 3/2007 | Rubinstein et al. | ........... | 455/410 |
| 7,339,913 B2 * | 3/2008 | Chou et al. | .................... | 370/338 |
| 7,346,025 B2 * | 3/2008 | Bryson | ......................... | 370/328 |
| 7,355,996 B2 * | 4/2008 | Hrastar | ......................... | 370/328 |

(Continued)

*Primary Examiner* — Lester Kincaid
*Assistant Examiner* — Diego Herrera
(74) *Attorney, Agent, or Firm* — Brinks Gilson & Lione

(57) ABSTRACT

A system and method supporting over-the-air programming of access device such as, for example, a mobile multimedia handset and a wireless personal digital assistant (PDA) via a broadband access gateway, is disclosed. The broadband access gateway may receive identifying information from the access device via a personal area network and/or a wireless local area network, and may transfer the identifying information to a wide area network or a third party content provider, via a broadband network. The broadband access gateway may enable the registration of the access device with the wide area network, and may receive firmware/software updates and/or provisioning parameters via the broadband network. The gateway may then transfer the firmware/software update and/or provisioning parameters to the access device via the personal area network and/or wireless local area network.

47 Claims, 8 Drawing Sheets

(56) References Cited

U.S. PATENT DOCUMENTS

| | | | |
|---|---|---|---|
| 2001/0038609 A1* | 11/2001 | Yamaguchi | 370/229 |
| 2002/0019984 A1* | 2/2002 | Rakib | 725/111 |
| 2002/0031120 A1* | 3/2002 | Rakib | 370/386 |
| 2002/0035404 A1* | 3/2002 | Ficco et al. | 700/65 |
| 2002/0038459 A1* | 3/2002 | Talmola et al. | 725/81 |
| 2002/0078209 A1* | 6/2002 | Peng | 709/227 |
| 2002/0132611 A1* | 9/2002 | Immonen et al. | 455/414 |
| 2002/0191635 A1* | 12/2002 | Chow et al. | 370/463 |
| 2003/0022659 A1* | 1/2003 | Mun et al. | 455/415 |
| 2003/0060221 A1* | 3/2003 | Eberlein et al. | 455/503 |
| 2003/0061077 A1* | 3/2003 | Sagar | 705/5 |
| 2003/0061615 A1* | 3/2003 | Van Der Meulen | 725/74 |
| 2003/0093476 A1* | 5/2003 | Syed | 709/204 |
| 2003/0171113 A1* | 9/2003 | Choi | 455/420 |
| 2003/0182412 A1* | 9/2003 | Lee et al. | 709/223 |
| 2004/0028009 A1* | 2/2004 | Dorenbosch et al. | 370/329 |
| 2004/0047358 A1* | 3/2004 | Chen et al. | 370/401 |
| 2004/0063497 A1* | 4/2004 | Gould | 463/42 |
| 2004/0185777 A1* | 9/2004 | Bryson | 455/41.1 |
| 2004/0203387 A1* | 10/2004 | Grannan | 455/41.2 |
| 2004/0203592 A1* | 10/2004 | Kermode et al. | 455/411 |
| 2004/0261112 A1* | 12/2004 | Hicks et al. | 725/89 |
| 2005/0034147 A1* | 2/2005 | Best et al. | 725/10 |
| 2005/0058062 A1* | 3/2005 | Rudolf et al. | 370/216 |
| 2005/0064860 A1* | 3/2005 | DeLine | 455/420 |
| 2005/0089052 A1* | 4/2005 | Chen et al. | 370/401 |
| 2005/0094663 A1* | 5/2005 | Rahman et al. | 370/466 |
| 2005/0174961 A1* | 8/2005 | Hrastar | 370/328 |
| 2005/0185622 A1* | 8/2005 | Svensson et al. | 370/338 |
| 2005/0185656 A1* | 8/2005 | Svensson et al. | 370/398 |
| 2005/0190747 A1* | 9/2005 | Sindhwani et al. | 370/352 |
| 2005/0190792 A1* | 9/2005 | Dunk | 370/469 |
| 2005/0198525 A1* | 9/2005 | Trossen et al. | 713/200 |
| 2005/0233744 A1* | 10/2005 | Karaoguz et al. | 455/432.3 |
| 2005/0241004 A1* | 10/2005 | Pyhalammi | 726/29 |
| 2005/0282490 A1* | 12/2005 | Nurmi | 455/11.1 |
| 2006/0160536 A1* | 7/2006 | Chou | 455/435.1 |
| 2006/0258344 A1* | 11/2006 | Chen | 455/419 |
| 2006/0280157 A1* | 12/2006 | Karaoguz et al. | 370/338 |
| 2007/0121834 A1* | 5/2007 | Mamiya et al. | 379/110.01 |

\* cited by examiner

OVER THE AIR PROGRAMMING VIA A BROADBAND ACCESS GATEWAY

RELATED APPLICATIONS

The present application makes reference to, claims priority to, and claims benefit of U.S. Provisional Patent Application Ser. No. 60/563,894, entitled "Method And System For Handling And Backhauling Traffic From A Wired And/Or Wireless WAN, LAN, And/Or PAN Using A Broadband Access Gateway", filed Apr. 16, 2004, the complete subject matter of which is hereby incorporated herein by reference, in its entirety.

The present application makes reference to U.S. patent application Ser. No. 11/021,294, entitled "Method And System For Extended Network Access Services Advertising Via A Broadband Access Gateway", filed Dec. 23, 2004, the complete subject matter of which is hereby incorporated herein by reference, in its entirety.

The present application also makes reference to U.S. patent application Ser. No. 11/039,020, entitled "Method And System For Providing Registration, Authentication, And Access Via A Broadband Access Gateway", filed Jan. 18, 2005, the complete subject matter of which is hereby incorporated herein by reference, in its entirety.

The present application also makes reference to U.S. patent application Ser. No. 11/095,842, entitled "Registering Access Device Multimedia Content Via a Broadband Access Gateway", filed Mar. 30, 2005, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

One major common problem faced by cellular and landline service providers is market competition. In today's climate of competitive markets, cellular service providers have found that one way for them to grow market share and defend their businesses is to be proactive and form alliances, and to partner with landline service providers. In addition, cellular service providers seek to differentiate their service offerings, and to capture the largest portion of market revenue by meeting an ever increasing demand for access to a wide range of media forms such as MP3 encoded audio, still and video imaging, data, instant messaging, and email. In a similar manner, the landline service providers have found that to grow market share and ward off competition, they too must be proactive and form alliances, and to partner with cellular service providers. Support for broad economical access to these converging forms of communication is needed to enable unfettered market growth, and to support the development and use of new handheld devices needed to provide increasing levels of mobile multimedia communication functionality.

Although the formation of alliances and partnerships between cellular service providers and landline service providers may help to ward off competition, such alliances and partnerships are faced with other problems. For example, the erection of cellular infrastructure such as cellular towers may be an expensive venture since this may require acquisition of real estate, whether in the form of outright purchases or through leasing. Cellular infrastructure also requires the establishment of one or more expensive backbone links to handle core network traffic. Another cellular-related problem is that the cellular signals do not penetrate and propagate in buildings such as homes and offices very well. This is especially true with the frequencies that are typically utilized in the United States, which may vary between 800 MHz and 1900 MHz or 1.9 GHz.

To support operation in present day wireless networks, access devices such as, for example, cellular telephones and wireless personal digital assistants (PDAs) are sometimes provisioned manually, at a point of purchase, by a customer service representative. Such provisioning installs parameters required for operation with a particular service provider. Alternatively, such access devices may be automatically provisioned via the wireless network of a service provider, based upon customer activity at a web site, or a telephone conversation with a customer service representative. Depending upon the nature of the information to be provisioned, the number of active subscribers, and other factors, the programming of the cellular phone or PDA configuration/provisioning parameters may take from a few minutes, to several hours to complete.

In spite of the fact the electrical design of most current wireless handsets allows much of the firmware/software to be updated, it is seldom attempted due to the low data rates available via the typical cellular wireless network. Consumers typically return a mobile handset to a business location of their cellular service provider to have the memory of the cellular phone reprogrammed. This is inconvenient and time consuming, and few subscribers bother to have updated firmware installed. The costs involved with the use of the current infrastructure are also a deterrent for the service provider to engage in firmware updates. The lack of an easy and quick method of updating mobile handset firmware slows the deployment and adoption of new features, and leaves faulty or misbehaving mobile handsets in the field.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and method for over-the-air programming of a plurality of access devices via a broadband access gateway, substantially as shown in and/or described in connection with at least one of the figures, as set forth more completely in the claims.

These and other advantages, aspects, and novel features of the present invention, as well as details of illustrated embodiments, thereof, will be more fully understood from the following description and drawings.

DETAILED DESCRIPTION OF THE INVENTION

Aspects of the present invention relate to the seamless merging of wide area networks, from any kind of wired and/or wireless wide area networks, to pockets of wired and/or wireless local area networks and personal area networks, which may be located in homes or other environment such as an office or business. More specifically, aspects of the present invention relate to over-the-air (OTA) programming of access devices such as, for example, mobile multimedia handsets, personal computers, or personal digital assistants. The types of information that may be programmed into such devices using an over-the-air technique via a broadband access gateway may include, for example, provisioning information for the establishment of service, multimedia information, software and/or firmware to correct or update existing software and/or firmware, and new software and/or firmware to make available new capabilities and services. The over-the-air delivery of such information may be supported by a broadband access gateway that permits broadband network access via, for example, a personal cellular microcell, a personal area network (PAN), a wired or wireless wide area network (WAN), wireless local area network (WLAN) or other type of network located within a premises such as, for example, a home, office, business, or the like. Services that may be available via such a broadband gateway connection include, for example, access to the public switched telephone network (PSTN); Internet protocol (IP) phone access; extended access to commercial cellular and PCS networks such as, for example, TDMA, CDMA, and GSM; and access to and/or control of a variety of multimedia access devices or networked resources capable of providing streams of images, still pictures, video, and audio; to name only a few. Examples of multimedia information include streaming video, broadcast video, voice, digital data, text, digitized audio, digitized still images, digitized video, and digitized music. The merging of these various types of networks may enable transparent communication of all types of media between access devices, which may be coupled in a wired or wireless fashion to one or more of these networks. In an embodiment of the present invention, access to services available through a wireless broadband gateway may be simplified, permitting their use by a wider group of users of access devices in, for example, homes, offices, and businesses.

Figure 1:
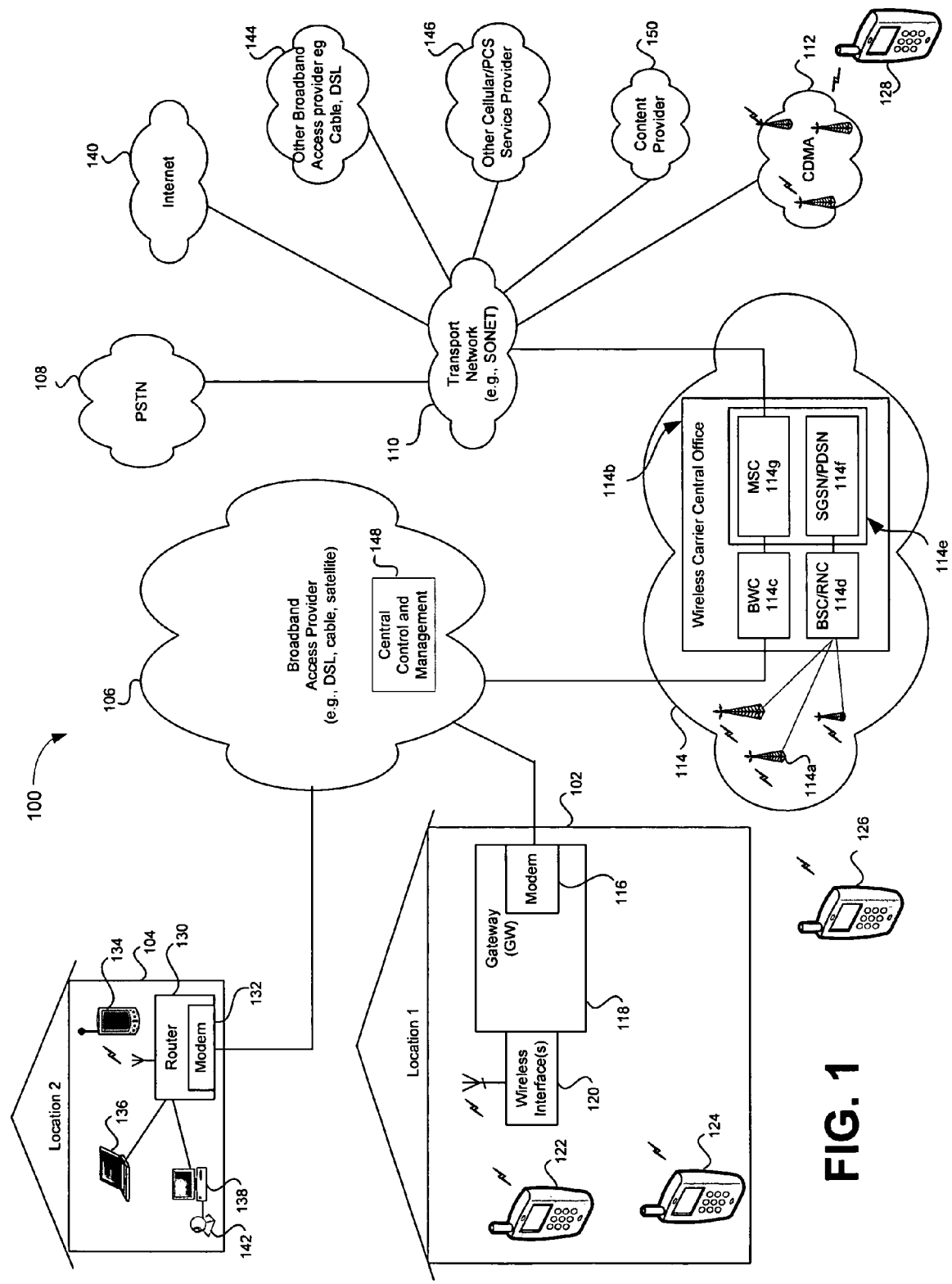
FIG. 1 is a block diagram illustrating an architecture of an exemplary communications system in which a representative embodiment of the present invention may be practiced.

FIG. 1 is a block diagram illustrating an architecture of an exemplary communications system in which a representative embodiment of the present invention may be practiced. Referring to FIG. 1, there is shown a first location 102, a second location 104, a broadband access provider (BAP) 106, public switched telephone network (PSTN) 108, a transport network 110, wireless networks including CDMA network 112 and GSM network 114, and access devices 126 and 128. The first location 102 comprises a gateway 118 having a modem 116, a wireless interface(s) block 120, and the access devices 122, 124. The access devices 122, 124, 126, 128 may comprise, for example, a mobile multimedia handset having a high level of functionality such as, for example, that of one or more of a digital video or still camera, a portable audio (MP3) player, a personal digital assistant, and a voice handset. The access devices 122, 124, 126, 128 may be capable of operating using, for example, a personal area network and/or wireless local area network compliant with, for example, Bluetooth, IEEE 802.11a/b/g/n, and/or IEEE 802.15.3a ultra-wideband standards. The second location 104 comprises a router 130 having a modem 132, and a plurality of wireless access devices. The plurality of wireless access devices at the second location 104 may comprise a personal computer (PC) 138, a laptop 136 and a wireless personal digital assistant (PDA) 134. A peripheral such as a digital camera 142 may be coupled to the personal computer 138. Other peripherals such as printers, digital scanners, speakers, and the like, which are not shown, may also be coupled to the personal computer 138 and/or laptop 136. The wireless interface block 120 may comprise a plurality of interfaces such as a Bluetooth interface, an IEEE 802.15.3a ultra-wideband interface, and any combination of an IEEE 802.11a, b, g and/or n interface.

FIG. 1 also comprises an "other broadband access provider" block 144, an "other cellular/PCS service provider" block 146, a central control and management block 148, and content provider 150. The "other broadband access provider block 144" may be, for example, a cable, DSL, or other type of broadband access provider. The central control and management block 148 may comprise suitable logic, circuitry and/or code that may be adapted to handle content delivery and security functions such as authentication, validation, key or certificate management, and authorization. The central control and management block 148 may also be adapted to handle provisioning and service management. In a representative embodiment of the present invention, the central control and management block 148 may establish communications links with, for example, the gateway 118, the broadband access provider 106, the other broadband access provider 144, the other cellular/PCS service provider 146, the CDMA network 112, and the GSM network 114 using actual or virtual connections.

The broadband access provider 106 may be, for example, a cable operator, telephone company, or satellite operator providing Internet access along with other communication services. In instances where BAP 106 is a telephone company, broadband service to locations 102, 104 may be provided via DSL or other broadband access technology. Accordingly, the modems 116, 132 may be DSL modems. In instances where BAP 106 is a cable operator, broadband service to locations 102, 104 may be provided via cable. Accordingly, the modems 116, 132 may be DOCSIS compliant or other type of cable modem. Given the rapid decrease in the cost of leased telephone lines over the past decade or more, the connection to the location 102, 104 may also be T1 or T3 connections. For example, a switch located at a central office (CO) (not shown) may be utilized to couple a T1 or T3 connection between the second location 104 and the PSTN 108.

The gateway 118 may comprise an integrated DSL modem, cable modem or other high-speed modem that may be required for handling a connection such as a T1 or T3 connection. Alternatively, the gateway 118 may be coupled to an external DSL modem, cable modem or other high-speed modem that may be capable of handling connections such as a T1 or a T3 connection. The gateway 118 may be adapted so that it has access to protocol stack information that may be related to the GSM and/or CDMA networks 114, 112, respectively. The gateway 118 may also be adapted to provide protocol support for communication with "other cellular/PCS service provider" block 146.

Each of the CDMA and GSM networks 112, 114 may comprise a plurality of cell sites (a/k/a cellular towers) that are located in geographical cells within each of the networks. Within the GSM network 114, each of the cell sites such as, for example, cell site 114*a* may comprise a base transceiver station (BTS), and one or more base transceiver stations (BTSs) may be coupled to wireless carrier central office 114*b*. The wireless carrier central office 114*b* may comprise a base station controller/radio network controller (BSC/RNC) such as BSC/RNC 114*d*. One or more base station controllers/radio network controllers (BSCs/RNCs) may be coupled to the core network 114*e*, that comprises a network edge switch called a mobile switching center (MSC), such as MSC 114*g*, and a serving GPRS support node (SGSN)/packet data serving node (PDSN) 114*f*, of the GSM network 114. The mobile switching center may be coupled to, for example, the PSTN 108 via the transport network 110. As an access device moves out of range of a first cell site to within range of a second cell site, the decrease signal power received from the first cell site and the increase in signal power received from the second cell site causes initiation of handoff of a call from the first cell site to the second cell site. In cases where there is no second cell site to handoff to, the call may be maintained by the first cell site power until it is attenuated to a threshold where it is no longer feasible to maintain the call. At the point where the power reaches or falls below this threshold, the call may drop and any related call resources may be relinquished. In a home and/or office environment, it may be desirable to have a second network to which the call may be handed off to.

As an illustration, a user may be on their way home and as the user approaches their home, the signal may fall below a minimum signal power threshold that is required to maintain a call. However, instead of dropping the call, the call may be handed off to, for example, a PAN or a wireless local area network (WLAN) that may be located within the user's home or an unlicensed wireless access system that may be located in the user's home. For example, with reference to FIG. 1, as access device 126 migrates from the vicinity of the serving cell site 114*a* in GSM network 114 towards the wireless interface 120 in the first location 102, the call may be handed off from the cell site 114*a* GSM network 114 to the wireless interface 120 coupled to the gateway (GW) 118 at the first location 102. Accordingly, instead of the call being dropped, the call has been seamlessly handed off and is now being handled by the gateway 118 via the wireless interface 120. The resulting wireless data may then be communicated to the GSM network 114 via the broadband connection to the BAP 106 which is connected to the broadband wireless local area network controller (BWC) 114*c*.

In this illustration, the user is handed off to their PAN, WLAN, or other network located within their home. However, the user could also have been handed off to another network system such as a neighbor's network. In any case, a gateway coupled to the wireless interface which is providing service to the user may communicate at least a portion of the data to, for example, the cable or DSL BAP 106, the GSM network 114, CDMA network 112, other broadband access service provider 144, other cellular/PCS service provider 146 and central control and management block 148. The user may be provided with a notification that indicates the presence of the PAN, WLAN, or other unlicensed network. For example, an icon representative of a personal area network may be displayed on the screen of the access device 126 once a soft or hard handoff is achieved from a serving cell site in GSM network 114 to the wireless interface 120 at the first location 102. A special tone or other audio alert may also be utilized to indicate that the call has switched to the wireless interface 120.

In instances where the gateway 118 detects a compatible access device that may be within the range of the wireless interface 120, the gateway 118 may immediately advertise its available services to the access device. In this regard, the gateway 118 may be adapted to transmit service advertisements to the access device in order to alert a user of the access device of the types of services that are being offered by the gateway 118. Signals containing icons representative of the services may be transmitted to and displayed on a screen of the access device and/or audio alerts may be utilized to notify the user of these services.

In another embodiment of the invention, quality of service (QoS) may also be advertised by the gateway 118. For example, when a user is being serviced by the wireless interface 120, the gateway 118 may advertise that stereo audio is available.

Access devices may be pre-registered so that when they are within the range of the wireless interface 120, the gateway 118 may automatically recognize them. For the pre-registration, an administrator of the gateway 118 at the first location 102 may register access devices that are allowed to access the gateway 118 when they are within the range of the wireless interface 120. Pre-registration may be done prior to the access device accessing the gateway 118. During pre-registration, an administrator or owner of the gateway 118 may enter registration or configuration information such as device IDs of access devices belonging to friends and/or family member's into a registration database associated with the gateway 118. As a result, these devices will be allowed to access at least a portion of the services offered by the gateway 118 whenever they attempt to access the gateway 118 by pressing a single button, for example. Opportunistic registration permits a user of an access device to register with the gateway 118 automatically with little or no effort on the part of the user. In this regard, registration information may be sent to the gateway 118 from an access device during an initial access and the gateway 118 may chose to accept or deny the registration. The registration information may be automatically or manually sent to the gateway 118.

In certain instances, an access device may not have been pre-registered to access the network. In this case, one button access may be provided. A single button such as a hard coded button or software-enabled button on an access device may be programmed to transmit identifying information from the access device to the gateway 118. The gateway 118 may utilize this transmitted identifying information to grant or deny access to its services. For example, one button may be programmed to contain access device identifying information related to accessing the services provided by gateway 118 at the first location 102. The gateway 118 may also be adapted to utilize digital certificates to authenticate access devices.

An interactive process may also be provided, whereby the gateway 118 may prompt or request particular information, for example a password from an access device requiring network access. If the particular information is received, then access to at least some of the services provided by the gateway 118 may be granted and if not, the access to at least some of the gateway's services may be denied.

In another embodiment of the invention, the one button access may be provided via software-enabled button (soft button) or hardware-enabled button (hard button). In this regard, the software button may be displayed on a screen of an access device.

A "walled garden" approach may be utilized to provide access to the services that may be offered by a particular gateway, for example, gateway 118. Under the walled garden approach, when an access device first registers or is identified, a basic set of services may be provided by the serving gateway 118 to the access device 124. The basic services offered may vary among each gateway. At least some of the basic services that are provided by a gateway such as gateway 118, may be offered without authenticating the access device 124. However, other services may only be offered if an access device such as access device 124 is properly authenticated. These services that are offered may be services that were advertised by the gateway 118.

In an aspect of the invention, access to additional services may be granted based on, for example, user identity, access device identity and or user input. The services offered to an access device by a gateway may be arranged in a hierarchical structure such as a tier. For example, in a first tier, a user may be prompted to enter membership information such as a member identification number. Upon authentication of the membership identification number, the first tier may provide restricted access with pop-up advertisements that may not be disabled. In a second tier, for example, a user may be prompted to enter a password. Upon authentication of the password, second tier information may provide restricted access to gateway services without pop-up advertisements. In a third tier, for example, entering billing information such as an account number or credit card or check card number may provide unlimited and/or unrestricted access to all the services offered by a gateway. A fourth tier may provide only operating instruction and information for guests.

An administrator of the gateway may establish the type of access provided by the walled garden. For example, if the first location 102 is a hotspot at a Café, the provider of the gateway may establish the service access levels or tiers that may be provided by the gateway 118.

When an access device is within the range of the gateway 118, wireless service is handed off from a serving cell site 114a in the GSM network 114 to the gateway 118. The access device may be authenticated by the gateway 118 and permitted to access at least some of the services offered by the gateway 118. Once the access device is authenticated, at least a portion of the information on the access device may be made available as a networked resource via the gateway 118. A user of the access device may chose whether information on the access device may be made available to the gateway and if so, that information which will be made available, and that information which will be unavailable to the gateway 118. In this regard, where information is made available, the gateway 118 may maintain a list of the resources that may be available on access devices that may be coupled to the gateway 118. For example, a list of contact information, calendar information, audio files, video file and/or data files stored on the access device may be sent to the gateway 118.

The resources that are available on the access device may also be advertised to other access devices that may be in communication with the gateway 118. Advertisement of the resources that may be available on an access device may be restricted to, for example, a list of particular devices, a particular type of devices or to a particular user. Accordingly, a user may have to be properly authenticated prior to certain information being made available to the user. Additionally, advertisement of the resources may cause certain icons representative of the resources to be displayed on other access devices. In a similar manner, icons representative of the resources that may be available on these other access devices may also be presented on the access device.

An access device may be provided with a welcoming screen that may allow a user of a device to sign up for either free or paid services. Once the signup is complete, subsequent access by the user may be authenticated by the gateway 118 utilizing the signup information. Whenever an access device registers with and/or is authenticated by the gateway 118, information on the access device may be updated and/or synchronized with information that may be on the gateway 118.

Devices within the location of the gateway 118 may be configured to register certain portions of their data content with the gateway 118 through a gateway registration process. Once data for these devices is registered to the gateway 118, the gateway may maintain a database, which keeps track of the data that is available, and its location. Accordingly, if the data previously stored in the database is no longer available, then information representative of the previously stored data may be removed from the database. Data from devices coupled to the gateway 118 such as on laptops, CD players, digital video disk (DVD) players, TIVO, personal video recorders (PVRs), personal digital assistants (PDAs) and other devices, may be registered with the gateway 118. This data may comprise audio, video, still pictures, and/or text.

At least a portion of the registered data may be made available to other network access devices via the gateway 118. In an aspect of the invention, the gateway 118 may be adapted to maintain a searchable list of data that may be available via the gateway. In this regard, the gateway may comprise a search engine that may be utilized to locate and distribute data that may be made available through the gateway 118. In another aspect of the invention, data may be made available to access devices via advertising by the gateway 118. Access devices may be configured to seek out particular data that may be of interest. Accordingly, an access device may be adapted to receive and process only those gateway advertisements may fit particular criteria. Those advertisements that may not fit the particular criteria may be discarded or ignored.

When an access device is within the range of the gateway 118, wireless service may be handed off from a serving cell site 114a in the GSM network 114 to the gateway 118. The access device may be authenticated by the gateway 118 and permitted to access at least some of the services offered by the gateway 118. Once the access device is authenticated, a user of the access device may have a desire to locate a particular video presentation. The user may access the search engine, which may have been advertised to the user's access device by the gateway 118. The search engine may appear on the display of the user's access device as an icon. The user may then activate a search by selecting the search engine icon, inputting a name of the video presentation and executing the search.

In another embodiment of the invention, the gateway may be adapted to classify information based on a given criterion. This classification may assist with locating information based on a particular criterion. In this regard, a user of the access device may be presented with a list of classifications and may select one, which may be of interest based on a particular criterion. This may narrow the focus of a search.

The gateway may also be utilized to facilitate seamless synchronization of data between devices that may be wired or wirelessly coupled to the gateway 118. For example, audio files located in a music folder on a PC coupled to the gateway 118 may be synchronized with a wireless media player coupled to a hot spot in an airport while a user of the wireless access media player waits to board a flight. In this regard, the gateway may determine what files need to be synchronized and control how the synchronization is accomplished. The same is true for files that may be downloaded from the PC to the wireless access media player, and for files that may be uploaded from the wireless access media player to the PC. Calendar and/or contact information may also be updated and/or synchronized with a mobile multimedia handset in a similar manner utilizing the gateway 118.

A location-aware service determines an approximate location of a network device and adapts delivery of a particular service application and/or content according to a quality of service criterion. The delivery of location-aware services may be controlled by the gateway 118. For example, a user of an access device may request playback of an audio clip via the gateway 118. After receiving the request for playback of the audio clip, the gateway 118 may determine that a channel between the gateway 118 and the user's access device may only be capable of maintaining a reduced playback rate. As a result, instead of sending 128 kbps encoded audio data, then the gateway may send 96 kbps data. Hence, in a case where the audio data was originally stored in 128 kbps sampled audio data, then the gateway 118 may transcode the 128 kbps sampled data to 96 kbps audio data.

In another illustrative embodiment of the invention, while the GSM network 114 is servicing the access device, lower compression rates may be utilized to provide service to the access device. However, when the access device roams within range of the wireless interface 120 and is being served by the gateway 118 through wireless interface 120, higher compression rates may be utilized. For example, audio data sampled at a data rate of 64 kbps may be utilized for playback on an MP3 enabled telephone while the phone is being serviced by a cell site 114a in the GSM network 114. However, once the MP3 enabled telephone is within the operating range of the wireless interface 120 and is being serviced by the gateway 118, the gateway 118 may automatically adapt to a higher data rate of, for example, 92 kbps or 128 kbps.

Automatic format conversion by the gateway 118 may include converting data from a first format to at least a second format suitable for delivery and/or display on an access device. This may permit data that would otherwise be incompatible with a first access device to be played on that first access device. For the location-aware services based on QoS, data was converted from a first format 128 kbps to a second format 96 kbps to achieve and/or maintain a particular QoS, but the data type remained the same. In this case, the audio format and/or its data type may be different. For example, if the audio format was MP3, then after the conversion, the format remained WAV and/or the sampling rate may have decreased from 128 kbps top 96 kbps.

In conventional wired caller ID systems, a name and/or directory number (DN) of a calling party may be transferred either in-band or out-of-band to a called party and may be displayed on the called party's caller ID display when a call is answered. In these conventional systems, the caller ID information is limited to a callers name, directory number (DN), general location and/or time of call. In wireless telephone systems, in order to save on bandwidth, only a caller's directory number is transferred and displayed to a calling party. However, if the calling party's directory number and name is stored in the called party's phone, then the stored name and stored directory number will be presented on a display of the called party's terminal. In this case, the stored directory number is compared with the transferred caller's directory number, and if a match occurs, then a name corresponding to the matching directory number is also displayed on the called party's terminal.

In accordance with an embodiment of the invention, the gateway 118 is adapted to determine the appropriate caller ID information that may be displayed in a called and/or calling party's caller ID. In this case, reverse caller ID information may be displayed on both a calling and a called parties terminal by the gateway 118.

If a called and/or calling device is a mobile multimedia handset and/or laptop, for example, contact or other personal information may be displayed the caller's and/or calling party's directory number. The level or amount of information that may be displayed may be varied. Certain sensitive information relating to either the called or calling party may be restricted from being displayed.

In current cellular communication systems, over the air (OTA) programming is utilized to program a cellular telephone during the provisioning process. In some instances, cellular providers have established websites that may be utilized or OTA programming. In this regard, a cellular subscriber may access the website and enter information such as the assigned directory number and the electronic serial number of the cellular telephone being programmed.

In accordance with a representative embodiment of the invention, an access device may be registered using over the air programming via the gateway 118. A user of an access device may send access device information to the gateway 118 using, for example, a default interface that may be presented to and displayed on a screen of the access device when the access device first enters the service area of the wireless interface 120. During registration, the capabilities of an access devices may be sent to the gateway 118 and may be shared with devices that may be coupled to the gateway 118.

Since the gateway acts as a registrar of information for all the access devices that may be wired or wirelessly coupled to it, the gateway may function as a personal digital assistant for any of these access devices. In an illustrative example, a first device, a first PC and a second PC are being serviced by the gateway 118. The first access device receives a call and the caller ID information shows the callers name, home directory number and home address. However, the first PC contains the business address for the caller and the second PC contains the monthly calendar information for the caller. Assume that the caller had a desire to setup a business meeting. In accordance with an aspect of the invention, the gateway 118 may be adapted to provide the business address of the caller to the first access device and also provide the caller's calendar to the first access device. In this manner, the network centrally provides all the information necessary for scheduling the meeting. In this example, the first PC may belong to the user of the first access device and the second PC may belong to the caller.

This concept may be extended to a look-up or 411 directory assistance on the Internet. The lookup may also be location dependent. In this regard, if a user is located in Hollywood and requests a hotel location, the gateway 118 may only cause the hotels that are located in Hollywood to be displayed to the user.

The gateway 118 may also be adapted to create profile information based on data usage. These created profiles may be utilized to create social networks for people having common interests. Accordingly, users may be permitted to post their interests and also select those people having similar interests based on the created profile. Based on the created profile information and the posted user interests, the gateway 118 may also generate a list of those people who have similar interest and also those users that may potentially have similar interests.

Given the capability to seamlessly operate an access device as one migrates from outside the home into the home, it is desirable to have a single device that may be adapted to control at least some of the devices that may be found within the home. In addition to its normal voice or data communication operating mode, an access device may be configured to operate as a universal remote that may be utilized to remotely control a plurality or other devices such as a TV, DVD, CD, Stereo, display monitor, or a combination thereof. Most access devices currently have an IR transmitter, which may be adapted to communicate with other IR receiver devices.

The access device may be used for wireless communication and for remotely controlling an electronic device with as a TV, CD/DVD recorder/player, or other device. The access device may also include at least one soft-button that may be enabled through the gateway 118 and may be utilized to control any other device that may be coupled to the gateway 118.

The gateway 118 is adapted to virtually aggregate data that may be visible from a plurality of access devices or other network devices. Although the gateway 118 may be adapted to store some service and content related information, the gateway 118 does not actually store copies of data that resides the access devices and/or other network devices that may be wired or wirelessly coupled to it. However, the gateway 118 may store, for example, metadata information that may be utilized to locate and access the information stored on the access devices and/or other network devices. The gateway is therefore adapted to function as a registrar of both service and content related information.

Whenever an access device registers with and/or is authenticated by the gateway 118, information may be collected from the access device and related metadata information may be updated and/or synchronized with information that may be currently stored on the gateway 118. Additionally, when a device is no longer being serviced by the gateway 118, associated information may be released from the gateway 118. In this regard, the virtual aggregations function performed by the gateway 118 guarantees that the most current information is accessible from the access devices.

Figure 2:
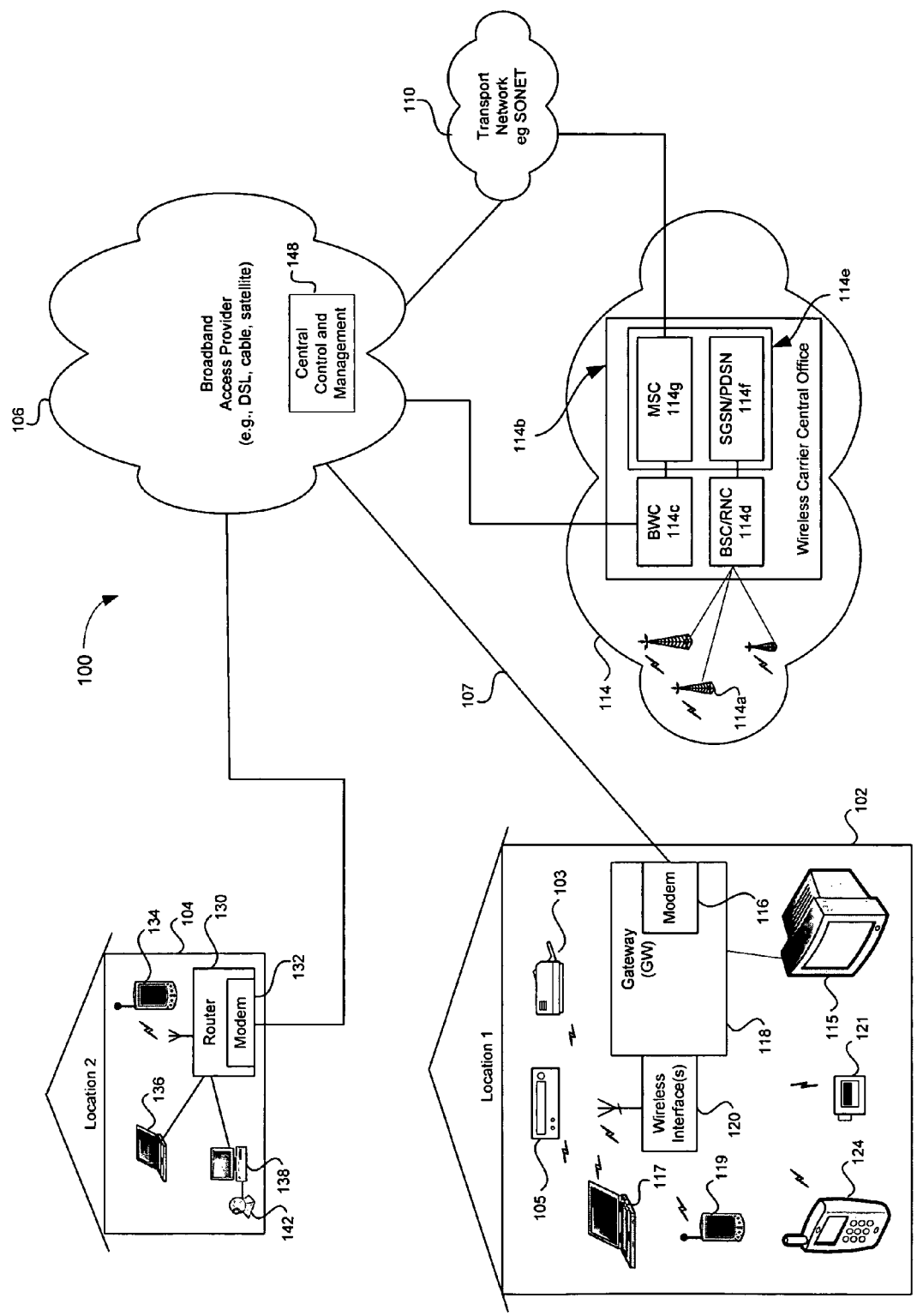
FIG. 2 shows a block diagram illustrating an exemplary communication system 100, in accordance with a representative embodiment of the present invention.

FIG. 2 shows a block diagram illustrating an exemplary communication system 100, in accordance with a representative embodiment of the present invention. The communication system 100 shown in FIG. 2 comprises a wireless interface 120, a gateway (GW) 118 with a modem 116, and an array of access devices such as, for example, a printer 103, a stereo receiver 105, a laptop 117, a wireless personal digital assistant (PDA) 119, and a digital video camera 121, at location 102. The communication system 100 of FIG. 2 also comprises an access device 124 that may correspond, for example, to the access devices 122, 124, 126 of FIG. 1. A second location 104 within communication system 100 comprises a router 130 with a modem 132, and a plurality of wireless access devices. The plurality of access devices at the second location 104 may, for example, comprise a personal computer (PC) 138, a laptop 136, and a wireless personal digital assistant (PDA) 134. A peripheral such as, for example, a digital camera 142 may be coupled to the personal computer 138. Other peripherals such as, for example, printers, digital scanners, speakers, and the like, that are not shown in FIG. 2, may also be coupled to the personal computer 138 and/or laptop 136. The wireless interface 120 may comprise a plurality of interfaces such as, for example, a Bluetooth interface, a cellular interface, and any combination of an IEEE 802.11a, b, g, and/or n interface, and/or an IEEE 802.15.3a ultra-wideband interface. Although the following discussion refers frequently to the capabilities and actions of the gateway 118 and wireless interface 120, the same may be said of the router 130 with the modem 132 of FIGS. 1 and 2, for example, without departing from the spirit and scope of the present invention.

In accordance with a representative embodiment of the present invention, a wireless access device such as access device 124 may be mobile, and may move between the personal area network/wireless local area network coverage provided by wireless interface 120 at location 102, the wide area network coverage provided by, for example, GSM network 114, and the coverage provided by the router 130 and modem 132 at location 104. The location 102 may, for example, be the home of the user of the access device 124, the home of a friend or relative of the user of access device 124, or an office, business, etc., where the user of access device 124 may travel. The location 104 may, for example, be a second home of the user of access device 124, the home of a friend or relative, an office, or may have no personal or business relationship with the user of access device 124. In a representative embodiment of the present invention, the gateway 118 may comprise, for example, a set top box that may be coupled in a wireless or wired fashion to access devices such as, for example, a laptop computer or television, such as the laptop 117 and the television 115 of FIG. 2. Access to the communication bandwidth of a broadband network as previously described may be provided by the gateway 118 and the modem 116 to wired or wireless access devices in the vicinity of location 102, and via router 130 and modem 132 to wired or wireless access devices in the vicinity of location 104, as shown in FIG. 2. This architecture may provide extended access to wireless networks such as, for example, the GSM network 114, CDMA network 112, other cellular/PCS service provider 146, Internet 140 and public switched telephone network 108, of FIG. 1. The modem 116 is shown connected to a broadband access provider (BAP) 106 via a broadband connection 107. The broadband connection 107 may comprise, for example, a digital subscriber line (DSL) connection, a cable network connection, a satellite connection, a T1 or T3 network connection, or similar broadband communication link. The modem 116 is compatible with the broadband connection 107, and may be, for example, a DSL modem, a DOCSIS-compliant cable modem, a satellite service modem, or T1 or T3 compatible modem-type device. The broadband connection may provide access through BAP 106 to location 104, and via transport network 110 to, for example, GSM network 114.

In the example illustration of FIG. 2, a user of the access device 124 may or may not be engaged in communication with another system or subscriber accessible via the GSM network 114, or other wide area network of FIG. 1. Although the present example of FIG. 2 shows a GSM network 114, a representative embodiment of the present invention may be employed with respect to other wide area networks such as, for example, the CDMA network 112 and other cellular/PCS service provider 146, shown in FIG. 1.

When an access device such as, for example, the access device 124 of FIG. 2 moves into the coverage area of a personal area network/wireless local area network of, for example, the wireless interface 120 and gateway 118, or the router 130, the access device 124 may be authenticated by the gateway 118 or router 130. The authentication may involve the sharing or exchange of identification and/or authentication information by the access device 124 with the gateway 118 or router 130. Details of an example of such an interaction are provided in U.S. patent application Ser. No. 11/021,294, entitled "Method And System For Providing Registration, Authentication, And Access Via A Broadband Access Gateway", filed Dec. 23, 2004, the complete subject matter of which is hereby incorporated herein by reference, in its entirety. Once the access device 124 has been authenticated to the gateway 118, the access device 124 may be permitted to exchange multimedia information and services available via the access devices in communication with the gateway 118, or via networks connected to the gateway 118. Information about the available multimedia information and services may be shared by and/or with the access device 124 via information exchanged by the access device 124 and the gateway 118 or router 130. Additional information about the advertising of such information may be found in U.S. patent application Ser. No. 11/039,020, entitled "Method And System For Extended Network Access Services Advertising Via A Broadband Access Gateway", filed Jan. 18, 2005, the complete subject matter of which is hereby incorporated herein by reference, in its entirety. In a representative embodiment of the present invention, a broadband access gateway such as, for example, the gateway 118 or the router 130 of FIG. 2 may maintain a database of the information about the available multimedia information and services, described above. Details of an example of such a database of information about access device data may be found in U.S. patent application Ser. No. 11/095,842, entitled "Registering Access Device Multimedia Content Via A Broadband Access Gateway", filed Mar. 30, 2005, the complete subject matter of which is hereby incorporated herein by reference, in its entirety.

In a representative embodiment of the present invention, an access device such as, for example, the access device 124 of FIG. 2 may be provisioned with parameters and other data enabling operation within a wide area network such as, for example, the GSM network 114, using an over-the-air (OTA) communication link via a broadband access gateway such as, for example, the gateway 118 or the router 130 of FIG. 2. An access device such as, for example, a mobile multimedia handset, a personal digital assistant (PDA), and a pager, may receive OTA provisioning information/parameters via a personal area network or wireless local area network supported by the gateway 118 and the wireless interface 120, in place of the OTA provisioning normally provided via a wide area network such as, for example, the GSM network 114. Parameters that may be assigned by the operator of a wide area network and provisioned into an access device such as those access devices described above may include, for example, an access device address such as, for example, an international mobile station identifier (IMSI), a mobile identification number (MIN); a system identifier (SID). The parameters may also include one or more security keys; radio frequency operating parameters; access channel, control channel, paging channel, and/or neighbor lists; and access overload class information, to name only a few items. A representative embodiment of the present invention may enable the provisioning of large numbers of access devices, by distributing the provisioning communication load over a large number of broadband access gateways located, for example, in residences, businesses, offices, and the like.

In addition to the provisioning of parameters associated with what has traditionally been referred to as the number assignment module (NAM) of a cellular phone, a representative embodiment of the present invention may be employed for the transfer of other data as well. For example, a representative embodiment according to the present invention may be used to download updated or enhanced operating code (e.g., software and/or firmware) for an access device. The size of such updates and enhancements normally prohibits their download over the typically low-bit-rate connections provided by a wide area network such as, for example, the GSM network 114. By employing the broadband connection and personal area and/or wireless local area network supported by, for example, the wireless interface 120 and the gateway 118, a representative embodiment of the present invention permits the transfer of large amounts of data to an access device, without impacting the performance of the wide area network. Other forms of data may also be transferred to an access device using a representative embodiment in accordance with the present invention including, for example, games and downloadable ring tones.

Figure 3A:
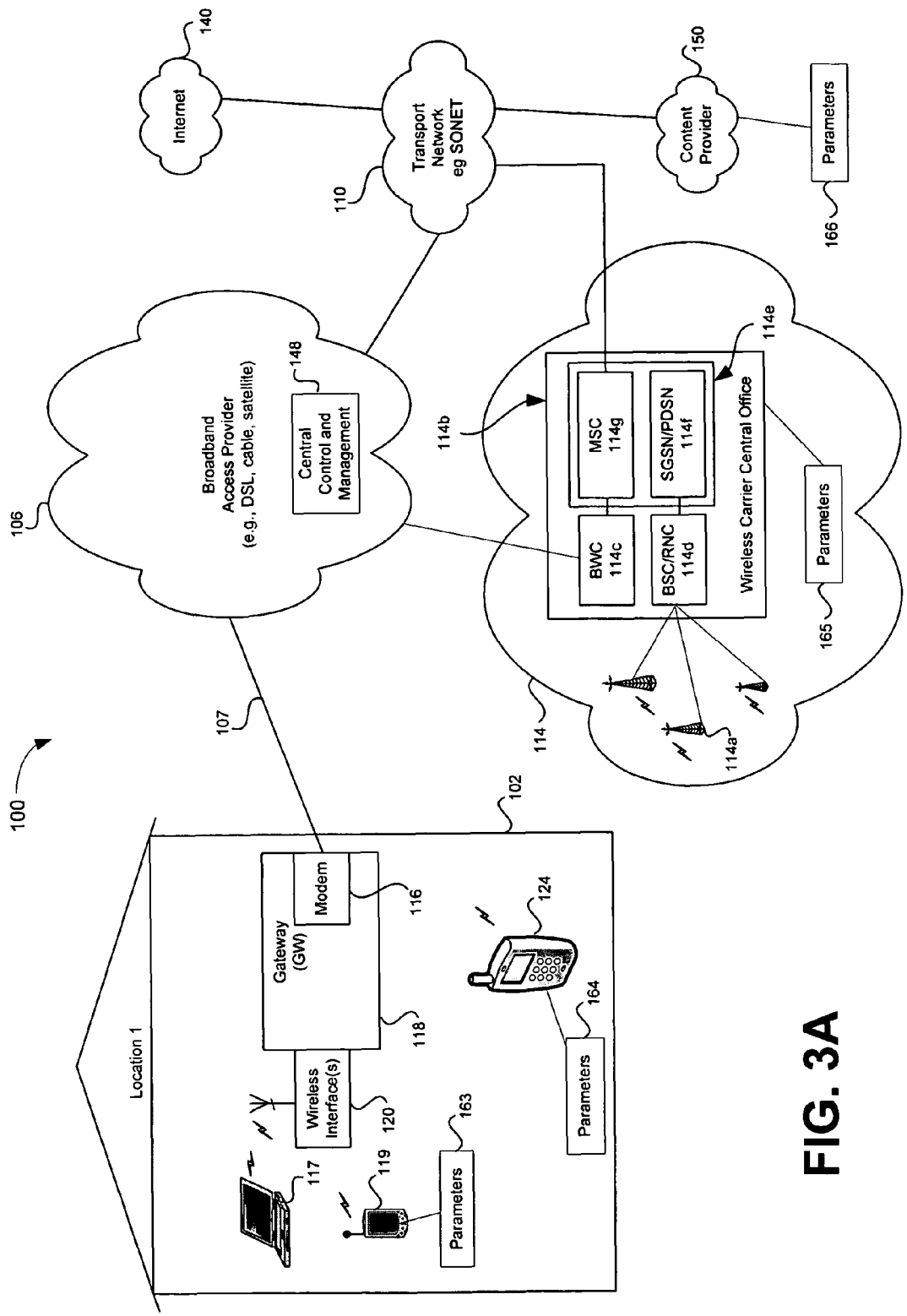
FIG. 3A shows a block diagram illustrating a communication system supporting over-the-air (OTA) programming of parameter information, that may correspond to a portion of the communication system of FIG. 2, for example, in accordance with a representative embodiment of the present invention.

FIG. 3A shows a block diagram illustrating a communication system 100 supporting over-the-air (OTA) programming of parameter information, that may correspond to a portion of the communication system 100 of FIG. 2, for example, in accordance with a representative embodiment of the present invention. The communication system 100 shown in FIG. 3A comprises a wireless interface 120, a gateway (GW) 118, a modem 116, and an array of access devices such as, for example, a laptop 117, a wireless personal digital assistant (PDA) 119, and an access device 124 that may correspond, for example, to the access devices 122, 124, 126 of FIG. 1. The wireless interface 120 may comprise a plurality of interfaces such as, for example, a Bluetooth interface, a cellular interface, and any combination of IEEE 802.11a, b, g, and/or n interface, and/or an IEEE 802.15.3a ultra-wideband interface. Although the following discussion refers frequently to the capabilities and actions of the gateway 118 and wireless interface 120, the same may be said of the router 130 of FIGS. 1 and 2, for example, without departing from the spirit and scope of the present invention.

The communication system 100 of FIG. 3A also comprises a central control and management function 148 that may be communicatively coupled to the gateway 118, an Internet service provider 140, a transport network 110, and a GSM network 114. The Internet service provider 140, the transport network 110, and the GSM network 114 may correspond, for example, to the Internet service provider 140, the transport network 110, and the GSM network 114 of FIGS. 1 and 2. Access to the communication bandwidth of a broadband network, as described above, may be provided by the gateway 118 and the modem 116 for the access devices at location 1 102, as shown in FIG. 3A. The modem 116 is shown connected to a broadband access provider (BAP) 106 via a broadband connection 107. The broadband connection 107 may comprise, for example, a digital subscriber line (DSL) connection, a cable network connection, a satellite connection, a T1 or T3 network connection, or similar broadband communication link. The modem 116 is compatible with the broadband connection 107, and may be, for example, a DSL modem, a DOCSIS-compliant cable modem, a satellite service modem, or T1 or T3 compatible modem-type device. The broadband connection may provide access through BAP 106, to the Internet 140, and to the transport network 110 connected to the content provider 150, and to the GSM network 114.

In an embodiment of the present invention, an access device capable of operating in a wide area network such as, for example, the GSM network 114 may comprise a number of parameters that configure or provision the access device for service with the GSM network 114. Such parameters are illustrated in FIG. 3A as the parameters 163 of the wireless PDA 119, and the parameters 164 of the access device 124. The parameters 163, 164 may be transferred from the set of parameters 165 of the GSM network 114, or the parameters 166 of the content provider 150, for example. In a representative embodiment of the present invention, the parameters 163, 164 may, for example, be transferred to the access device 124 and the wireless PDA 119, respectively, from the GSM network 114 or from the content provider 150, via the transport network 110, the BAP 106, and the gateway 118, rather than through the conventional path using the wireless wide area network supported by the GSM network 114.

In a representative embodiment in accordance with the present invention, an access device such as, for example, the access device 124 of FIG. 3A may be capable of receiving service via both a wide area network such as, for example, the GSM network 114, and a personal area network/wireless local area network such as, for example, that provided by the wireless interface 120 of the gateway 118, and may enter the coverage area of the wireless interface 120 and the gateway 118. The access device 124 may be unknown to the gateway 118, and may have been recently acquired from a vendor (e.g., a retail location of the service provider, a mass marketer, or via mail order) where no customization or provisioning is supported. The parameters 164 of the access device 124 will, therefore, have the values assigned to them during manufacture, and may not reflect or be related to the user/subscriber of the access device 124. Upon entering into communication with the gateway 118, the access device 124 may provide identification information to the gateway 118. Details of an example of such an interaction are provided in U.S. patent application Ser. No. 11/039,020, entitled "Method And System For Providing Registration, Authentication, And Access Via A Broadband Access Gateway", filed Jan. 18, 2005, the complete subject matter of which is hereby incorporated herein by reference, in its entirety. This identification information may comprise, for example, an electronic serial number, an international mobile equipment identifier (IMEI), an international mobile station identifier (IMSI), a mobile identification number (MIN), a media access control (MAC) address, an Internet protocol (IP) address, a digital certificate, a manufacturer identifier, a model identifier, a type identifier, and a service provider identifier, to name just a few such information items. Some of the identifying information may reside as parameters stored in the access device such as, for example, the parameters 164 of the access device 124 shown in FIG. 3A. In a representative embodiment of the present invention, such identifying information may be used to facilitate the provisioning of additional or updated service parameters, or the updating of code such as, for example, firmware and/or software in the access device 124 via a broadband access gateway such as, for example, the gateway 118 of FIG. 3A.

In one representative embodiment of the present invention, the gateway 118 may send a notification of the appearance of the access device 124 within the coverage area of the wireless interface 120, and some or all of the identification information, to a communication system management entity such as, for example, the central control and management function 148 shown in FIG. 3A. The central control and management function 148 may review the identification information from the access device 124, and may determine that the access device 124 is capable of, but not provisioned for, service via a wide area networks such as, for example, the GSM network 114. The central control and management function 148 may inform the gateway 118 of that fact. In a representative embodiment of the present invention, the gateway 118 may then prompt the user, to determine whether the user wishes to register for service with, for example, the GSM network 114. In another representative embodiment, the gateway 118 may inform the access device 124 of the option to register for service. The access device 124 may then prompt the user, to determine whether the user wishes to register for service with the GSM network 114.

In a representative embodiment according to the present invention, a portion of the identification information received by the gateway 118 may identify the service provider and the wide area network with which service may be established. Such information identifying a service provider may have been placed in the parameters 164 of the access device 124 at the time of manufacture, or by the vendor of the access device 124, prior to sale.

In a representative embodiment of the present invention, the access device 124 may be capable of operating on multiple service provider networks such as, for example, the GSM network 114, the CDMA network 112, and the other cellular/PCS service provider 146 shown in FIG. 1. In a representative embodiment according to the present invention, the user of an access device that is capable of multi-network operation may be prompted to indicate for which of the wide area networks the access device is to be provisioned.

In another representative embodiment of the present invention, the gateway 118 may itself review the identification information provided by the access device 124, and may recognize that the access device 124 is capable of operating within a wide area network such as, for example, the GSM network 114 shown in FIG. 3A. The gateway 118 may also recognize that the access device 124 has not yet been provisioned for operation within the GSM network 114, and that provisioning is appropriate. The gateway 118 may then communicate some or all of the identification information described above to the GSM network 114, along with information identifying the gateway 118. The GSM network 114 may then elect, for example, to engage in over-the-air (OTA) service provisioning (OTASP) of the access device 124, via the gateway 118 and the intermediate communication networks shown in FIG. 3A.

Figure 3B:
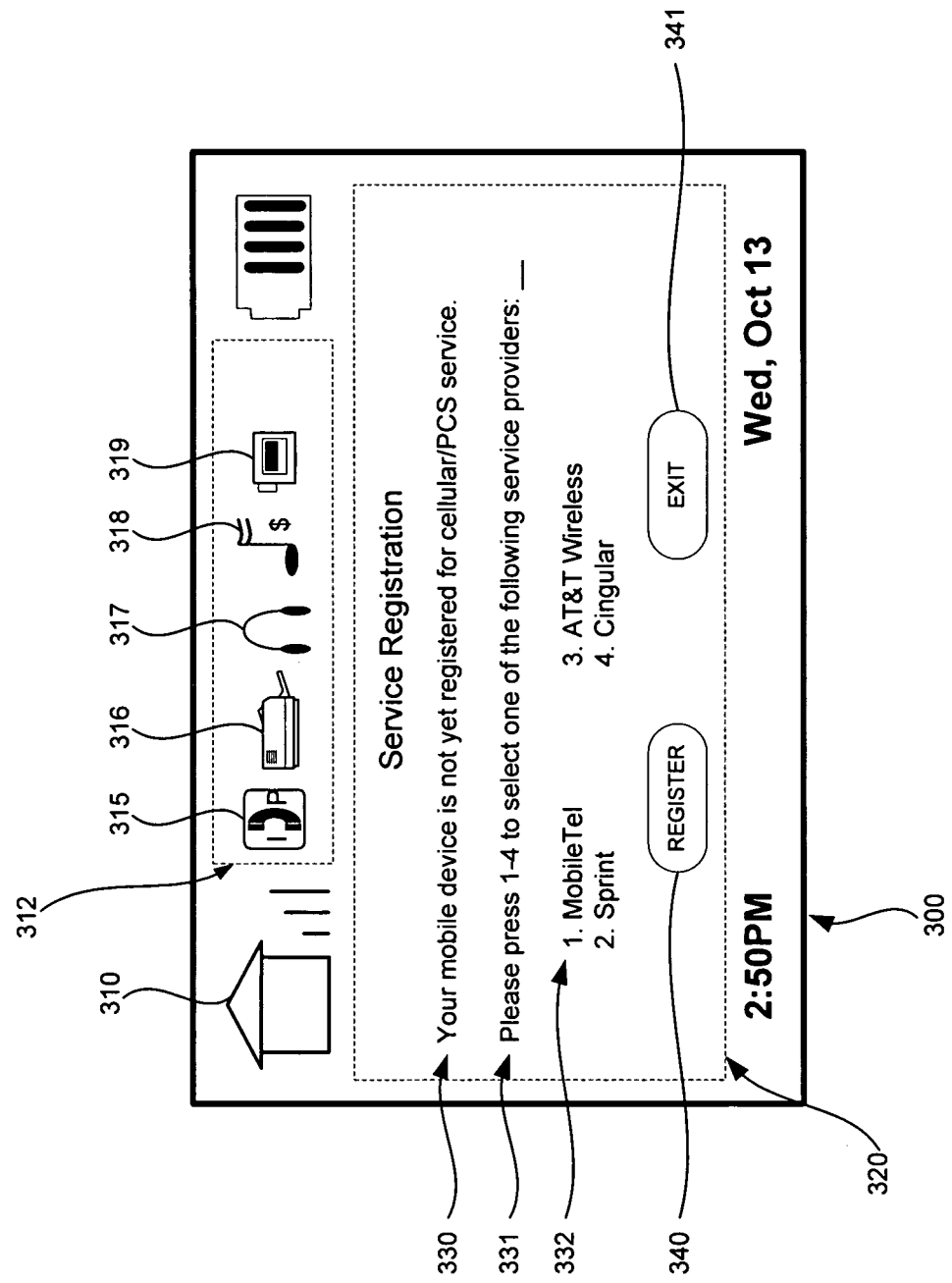
FIG. 3B illustrates a display showing an exemplary service registration screen that may be displayed by an access device such as, for example, the access device of FIG. 3A, in accordance with a representative embodiment of the present invention.

FIG. 3B illustrates a display 300 showing an exemplary service registration screen 320 that may be displayed by an access device such as, for example, the access device 124 of FIG. 3A, in accordance with a representative embodiment of the present invention. The display 300 of FIG. 3B comprises a network indicator 310, a network services indicator area 312, a battery life indicator, a time of day indicator, and a day and date indicator. The network services indicator area 312 of FIG. 3B comprises an Internet protocol (IP) phone service icon 315, a printer service icon 316, a stereo entertainment icon 317, a pay music service icon 318, and a video entertainment icon 319, showing those services that may be advertised by a broadband access gateway such as, for example, the gateway 118 of FIG. 3A, as being available to an appropriately identified or authorized user of the access device.

In a representative embodiment of the present invention, the service registration screen 320 of FIG. 3B may be displayed, for example, upon entry into the coverage area of a broadband access gateway such as, for example, the gateway 118 of FIG. 3A. As described above with respect to FIG. 3A, the user of an access device may be prompted to select registration with a wireless wide area network such as, for example, the GSM network 114 of FIG. 3A. An example of such prompting is shown as notification text 330 and request text 331. The user of the access device may select among the four network service providers 332, and may elect to register with the selected network service provider 332 using the "REGISTER" button 340, or to postpone registration by using the "EXIT" button 341. If the user elects to register, the access device 124 and elements of the communications network 100 of FIG. 3A may then follow the actions previously described above with respect to FIG. 3A in establishing service.

Figure 4A:
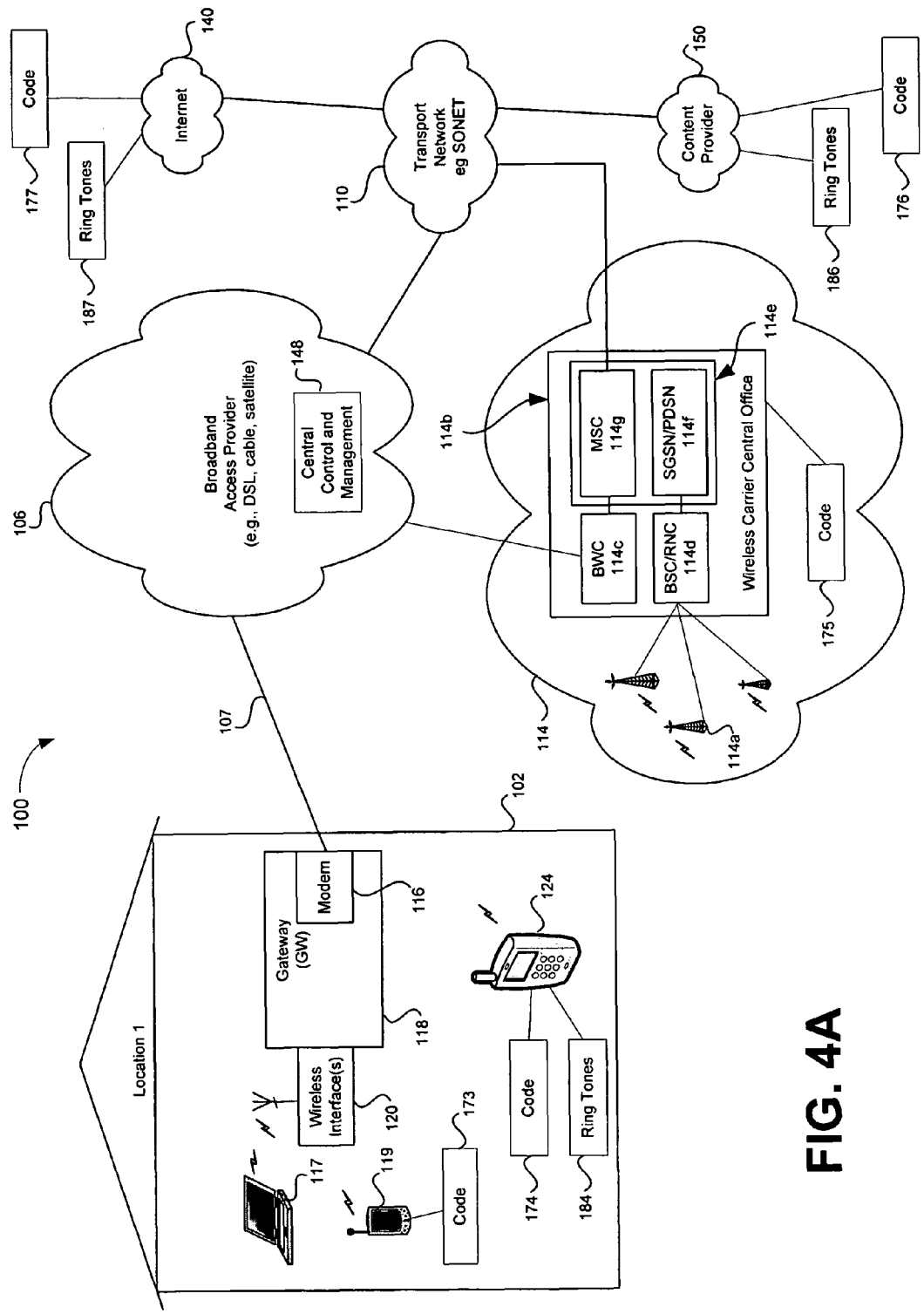
FIG. 4A shows a block diagram illustrating a communication system supporting over-the-air (OTA) updating of code such as, for example, firmware and software, that may correspond to a portion of the communication system FIG. 2, for example, in accordance with a representative embodiment of the present invention.

FIG. 4A shows a block diagram illustrating a communication system 100 supporting over-the-air (OTA) updating of code such as, for example, firmware and software, that may correspond to a portion of the communication system 100 of FIG. 2, for example, in accordance with a representative embodiment of the present invention. The communication system 100 shown in FIG. 4A comprises a wireless interface 120, a gateway (GW) 118, a modem 116, and an array of access devices such as, for example, a laptop 117, a wireless personal digital assistant (PDA) 119, and an access device 124 that may correspond, for example, to the access devices 122, 124, 126 of FIG. 1. The wireless interface 120 may comprise a plurality of interfaces such as, for example, a Bluetooth interface, a cellular interface, and any combination of IEEE 802.11a, b, g, and/or n interfaces, and/or an IEEE 802.15.3a ultra-wideband interface. Although the following discussion refers frequently to the capabilities and actions of the gateway 118 and wireless interface 120, the same may be said of the router 130 of FIGS. 1 and 2, for example, without departing from the spirit and scope of the present invention.

The communication system 100 of FIG. 4A also comprises a central control and management function 148 that may be communicatively coupled to the gateway 118, an Internet service provider 140, a transport network 110, and a GSM network 114. The Internet service provider 140, the transport network 110, and the GSM network 114 may correspond, for example, to the Internet service provider 140, the transport network 110, and the GSM network 114 of FIGS. 1 and 2. Access to the communication bandwidth of a broadband network, as described above, may be provided by the gateway 118 and the modem 116 for the access devices at location 1 102, as shown in FIG. 4A. The modem 116 is shown connected to a broadband access provider (BAP) 106 via a broadband connection 107. The broadband connection 107 may comprise, for example, a digital subscriber line (DSL) connection, a cable network connection, a satellite connection, a T1 or T3 network connection, or similar broadband communication link. The modem 116 is compatible with the broadband connection 107, and may be, for example, a DSL modem, a DOCSIS-compliant cable modem, a satellite service modem, or T1 or T3 compatible modem-type device. The broadband connection may provide access through BAP 106, to the Internet 140, and to the transport network 110 connected to the content provider 150, and to the GSM network 114.

An access device in a representative embodiment of the present invention such as, for example, the access device 124 and the wireless PDA 119 of FIG. 4A may comprise updatable code (e.g., software and/or firmware) and/or data used in the operation of the access device 124 and the wireless PDA 119. Examples of such code and/or data include, for example, user interface code, communication code, maintenance code, games, user application code, and similar executable program code. Such code and/or data may also comprise information such as, for example, phone books, address books, ring tones, and similar types of digital information. As shown in FIG. 4A, updatable code and/or data may be accessible to, for example, the wireless PDA 119 as code 173, and on the access device 124 as code 174 and ring tones 184. Items of code and/or data may be generated by and/or stored for distribution at, for example, the GSM network 114 as code 175, at a manufacturer of the access device 124 such as, for example, the content provider 150 as code 176 and ring tones 186, and perhaps from, for example, an independent information provider that may be located on the Internet 140 as code 177 and ring tones 187. Each of the repositories or sources of code and/or data listed above may be transferred to the wireless PDA 119 and the access device 124 via the elements of the communication network 100, and in particular, via the gateway 118 and the wireless interface 120.

In a representative embodiment in accordance with the present invention, an access device such as, for example, the access device 124 of FIG. 4A may be capable of receiving updated code and/or data via a personal area network/wireless local area network such as, for example, that provided by the wireless interface 120 of the gateway 118, and may enter the coverage area of the wireless interface 120 and the gateway 118. Upon entering into communication with the gateway 118, the access device 124 may provide identification information to the gateway 118. Details of an example of such an interaction are provided in U.S. patent application Ser. No. 11/039,020, entitled "Method And System For Providing Registration, Authentication, And Access Via A Broadband Access Gateway", filed Jan. 18, 2005, the complete subject matter of which is hereby incorporated herein by reference, in its entirety. This identification information may comprise, for example, an electronic serial number, an international mobile equipment identifier (IMEI), an international mobile station identifier (IMSI), a mobile identification number (MIN), a media access control (MAC) address, an Internet protocol (IP) address, a digital certificate, a manufacturer identifier, a model identifier, a type identifier, and a service provider identifier, to name only a few such items. Some of the identifying information may reside as parameters stored in the access device such as, for example, the parameters 164 of the access device 124. In a representative embodiment of the present invention, such identifying information may be used to facilitate the updating of code and/or data such as, for example, firmware or software in the access device 124 via a broadband access gateway such as, for example, the gateway 118 of FIG. 4A.

In a representative embodiment of the present invention, the access device 124 may send identification information to the gateway 118 upon arrival within, or while within the coverage area of the gateway 118, as described above. The gateway 118 may communicate such identification information to, for example, the central control and management function 148, or the GSM network 114. Based upon the received identification information, the central control and management function 148 or the GSM network 114 may determine that updated or replacement operating code (e.g., software and/or firmware) is available for the access device 124, and may inform the gateway 118 of that fact. The gateway 118 may then coordinate the retrieval of the updated code from the central control and management function 148, a wide area network such as, for example, the GSM network 114, and/or a manufacturer of the access device 124. In a representative embodiment of the present invention, a broadband access gateway such as, for example, the gateway 118, may also coordinate the updating of the access device 124.

In another representative embodiment of the present invention, the control and management function 148 or the gateway 118, for example, may forward the received identification information to a wide area network such as, for example, the GSM network 114. The GSM network 114 may then determine that updated code is available based upon the received identification information, and may establish an over-the-air (OTA) communication session to update the code of the access device 124 via the transport network 110, the BAP 106, and the broadband connection 107.

Figure 4B:
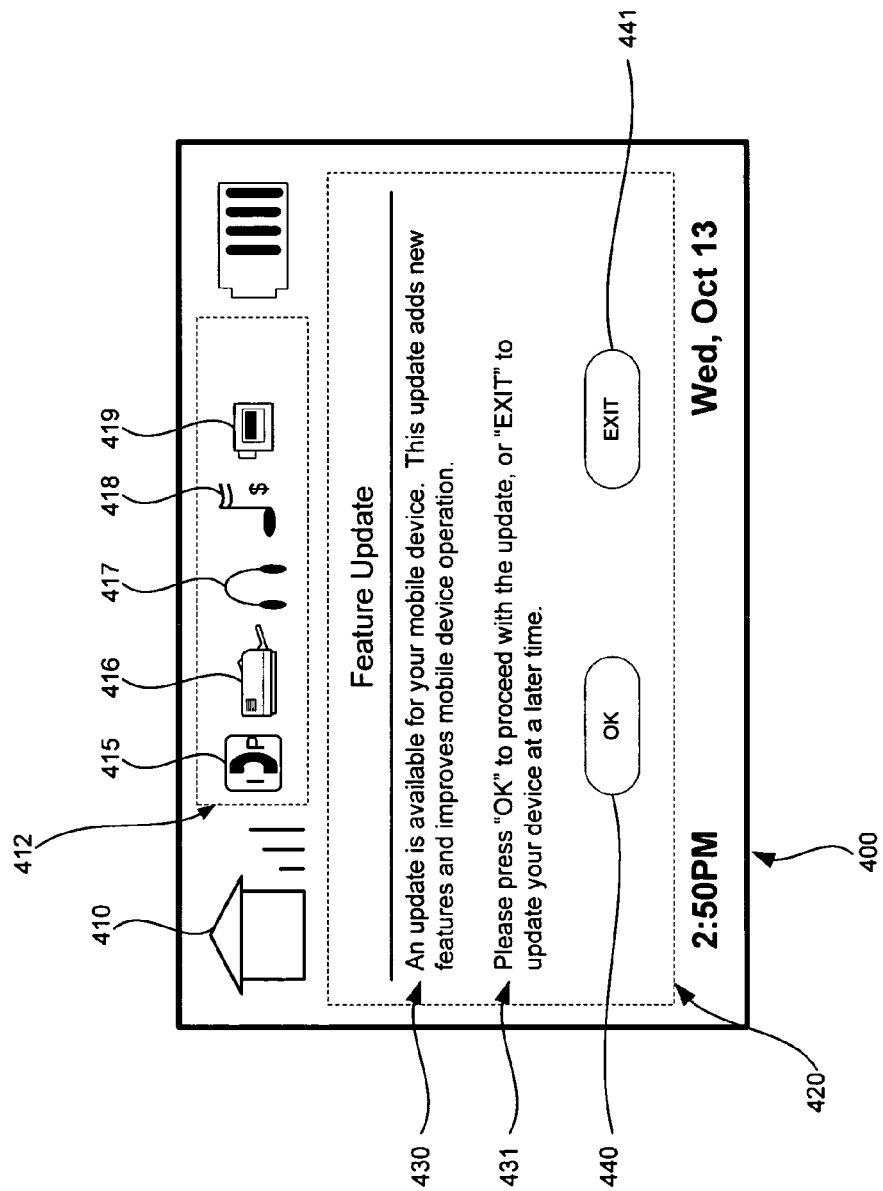
FIG. 4B illustrates a display showing an exemplary feature update screen that may be displayed by an access device such as, for example, the access device of FIG. 4A, in accordance with a representative embodiment of the present invention.

FIG. 4B illustrates a display 400 showing an exemplary feature update screen 420 that may be displayed by an access device such as, for example, the access device 124 of FIG. 4A, in accordance with a representative embodiment of the present invention. The display 400 of FIG. 4B comprises a network indicator 410, a network services indicator area 412, a battery life indicator, a time of day indicator, and a day and date indicator. The network services indicator area 412 of FIG. 4B comprises an Internet protocol (IP) phone service icon 415, a printer service icon 416, a stereo entertainment icon 417, a pay music service icon 418, and a video entertainment icon 419, showing those services that may be advertised by a broadband access gateway such as, for example, the gateway 118 of FIG. 4A, as being available to an appropriately identified or authorized user of the access device.

In a representative embodiment of the present invention, the feature update screen 420 of FIG. 4B may be displayed, for example, upon entry into or while within the coverage area of a broadband access gateway such as, for example, the gateway 118 of FIG. 4A. As described above with respect to FIG. 4A, the user of an access device may be notified of the availability of updated code and/or data for an access device such as, for example, the access device 124 of FIG. 4A by a broadband access gateway such as, for example, the gateway 118, the central control and management function 148, or a wide area network such as, for example, the GSM network 114, of FIG. 4A. Although the notification of the user shown in FIG. 4B is of a textual nature, a representative embodiment of the present invention may be in the form of, for example, a graphical representation of the application or service being updated. The user may then be prompted to select whether or not to accept the updated code and/or data. Examples of a notification and prompt are shown as notification text 430 and prompt text 431 in FIG. 4B. The user of the access device may elect to proceed with the update using "OK" button 440, or to refuse the update by using "EXIT" button 441. Should the user elect to register, the access device 124 and elements of the communications network 100 of FIG. 4A may then follow the actions previously described above with respect to FIG. 4A for the update of an access device.

Figure 5:
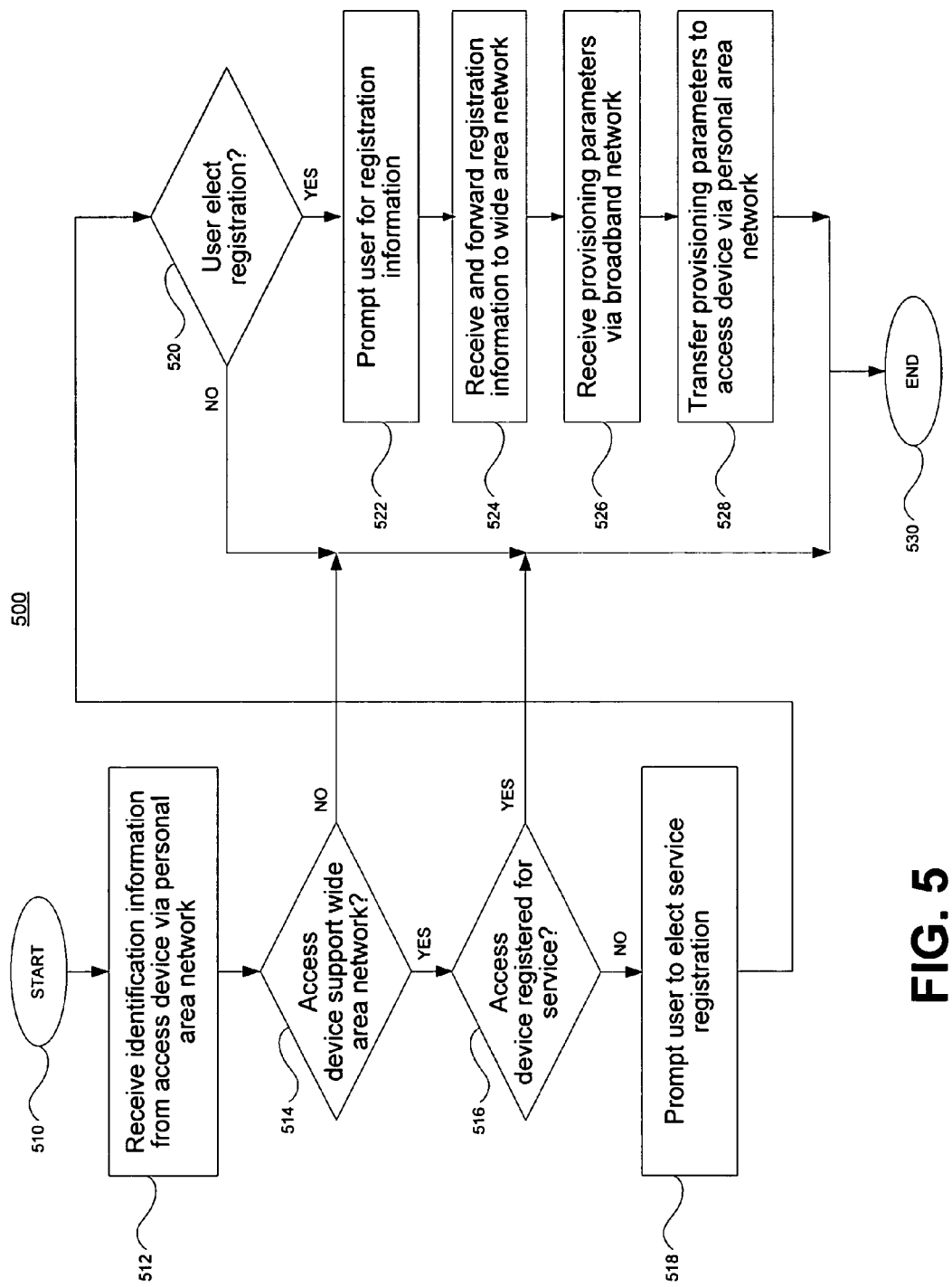
FIG. 5 shows a flowchart illustrating an exemplary method supporting over-the-air (OTA) programming of provisioning parameters in an access device such as, for example, the access device or wireless PDA of FIG. 3A, using a broadband access gateway that may correspond, for example, to the gateway of FIG. 3A, in accordance with a representative embodiment of the present invention.

FIG. 5 shows a flowchart 500 illustrating an exemplary method supporting over-the-air (OTA) programming of provisioning parameters using a broadband access gateway that may correspond, for example, to the gateway 118 of FIG. 3A, in accordance with a representative embodiment of the present invention. The method of FIG. 5 begins when a broadband access gateway such as, for example, the gateway 118 of FIG. 3A is powered up (block 510). As shown in the illustration of FIG. 5, at some time after power-up, the gateway 118 may receive identification information from an access device such as, for example, the access device 124 of FIG. 3A via a personal area and/or wireless local area network such as, for example, a Bluetooth network, or an IEEE 802.11a/b/g/n network (block 512). According to the exemplary method of FIG. 5, a broadband access gateway may then use the received identification information to determine whether the access device supports service via a wide area network (block 514). The wide area network may comprise, for example, the GSM network 114, the CDMA network 112, the other cellular/PCS service provider 146 shown in FIG. 1, or some similar network. If the access device does not support service via a wide area network, the method of FIG. 5 ends (block 530). If the access device is capable of supporting service via a wide area network, a determination may be made whether the access device is registered for service via the wide area network (block 516). This may be accomplished by querying the wide area service provider that is supported by the access device, using a broadband connection such as those described above with respect to FIG. 1, for example. If the access device is registered for service with the wide area network, the method of FIG. 5 ends (block 530). If the access device is not registered for service via the wide area network, a broadband access gateway using the method of FIG. 5 may cause the user to be prompted to elect service registration with the supported wide area network (block 518). If the user does not elect to register with the supported wide area network, the method of FIG. 5 ends (block 530). In one representative embodiment of the present invention, if the user does elect to register for service, the user may be prompted to enter user-specific information required for registration (block 520). The user may then enter the requested parameters such as, for example, information items enabling the billing of service charges. The gateway 118 may then receive and forward the registration information to the wide area network (block 524). The gateway 118 may then receive provisioning parameters via the broadband network, to enable the user of the access device to enjoy service from the wide area network (block 526). Such provisioning parameters may include, for example, a directory number, an international mobile station identifier (IMSI), a mobile identification number, roaming lists, neighbor lists, and other parameters for operation in a wireless network. The gateway 118 may then transfer the provisioning parameters to the access device via the personal area network (block 528), and the method of FIG. 5 ends (block 530).

Figure 6:
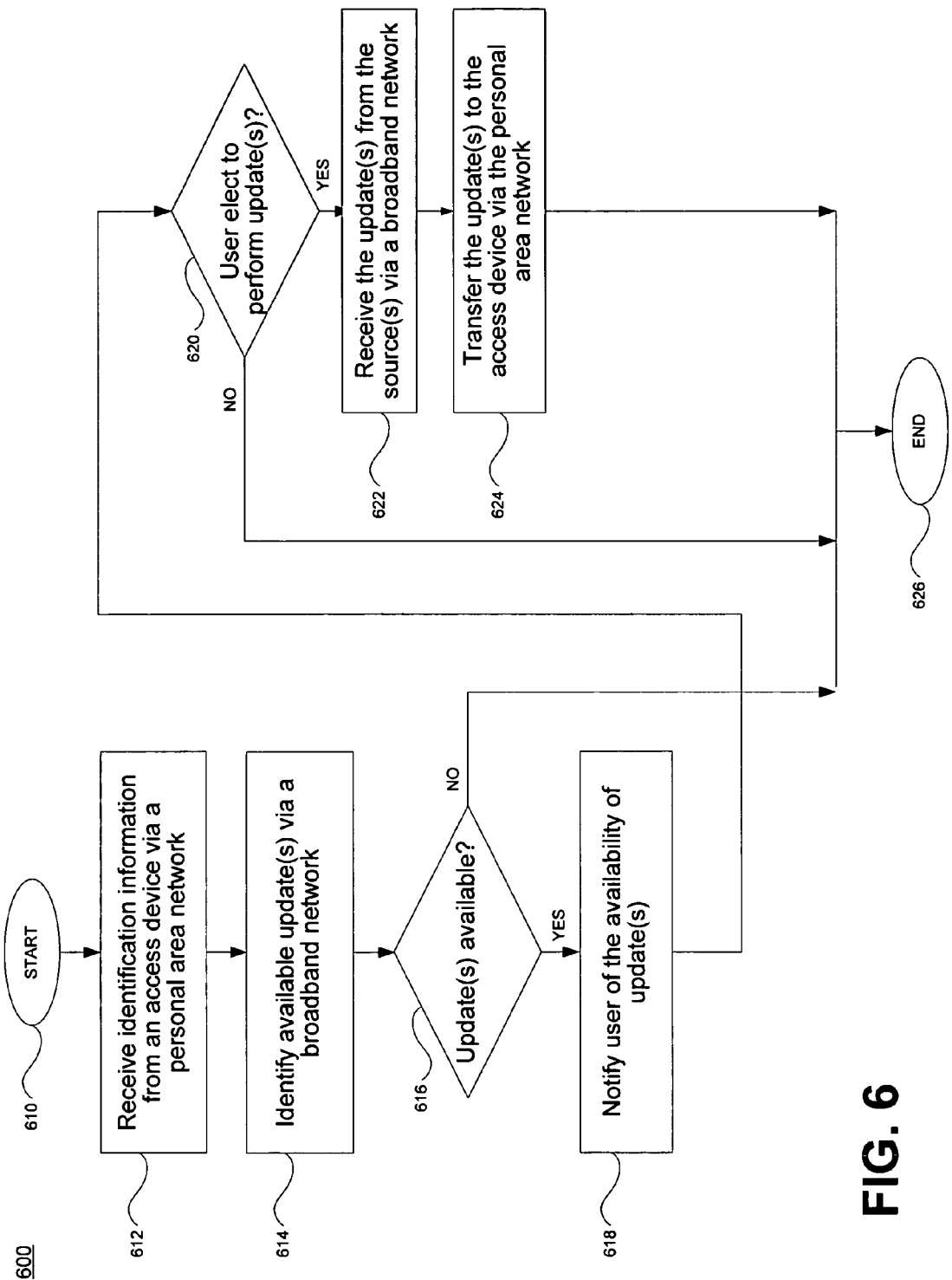
FIG. 6 shows a flowchart illustrating an exemplary method supporting over-the-air (OTA) updating of code (e.g., software and/or firmware) in an access device such as, for example, the access device or wireless PDA of FIG. 4A, using a broadband access gateway that may correspond, for example, to the gateway of FIG. 4A, in accordance with a representative embodiment of the present invention.

FIG. 6 shows a flowchart 600 illustrating an exemplary method supporting over-the-air (OTA) updating of code (e.g., software and/or firmware) in an access device such as, for example, the access device 124 or wireless PDA 119 of FIG. 4A, using a broadband access gateway that may correspond, for example, to the gateway 118 of FIG. 4A, in accordance with a representative embodiment of the present invention. As the method of FIG. 6 shows the gateway 118 may, at some point after power-up, receive identification information, via a personal area network, from an access device such as, for example, the access device 124 of FIG. 4A (block 612). The personal area network may comprise, for example, a Bluetooth network, an IEEE 802.11a/b/g/n network, or similar network. The gateway 118 may use the received identification information to identify whether updates for the software and/or firmware of the access device 124 are available (block 614). Updates may comprise, for example, code such as software, firmware, java applets and scripts, or other information such as phone books, personal directories, and ring tones, for example. Such code and information may be developed by sources such as, for example, the manufacturer of the access device 124, or by third parties such as, for example, the content provider 150 of FIG. 4A. If update(s) are not available for the access device (block 616), the method of FIG. 6 ends (block 626). However, if updates(s) are available for the access device 124 (block 616), the gateway 118 may notify the user of the availability of the updates (block 618). The notification may be in the form of, for example, a list of updates, or a graphical representation of the application(s) or service(s) being updated. If the user of the access device does not elect to perform the update(s) (block 620), the method of FIG. 6 ends (block 626). If, however, the user elects to perform the update (block 620), the gateway 118 may receive the update(s) from the source(s) via the broadband network (block 622). The gateway 118 may transfer the received update to the access device 124 via the personal area/wireless local area network (block 624). The method of FIG. 6 then ends (block 626).

Aspects of the present invention may be found in a system supporting over-the-air programming of a plurality of access devices via a broadband access gateway. In a representative embodiment of the present invention, the system may comprise a gateway communicatively coupled to a broadband network and at least one wireless interface. The gateway may be capable of selectively exchanging multimedia information among the at least one wireless interface and the broadband network, and of communicating with the plurality of access devices via the at least one wireless interface. The gateway may also be capable of receiving from at least one of the plurality of access devices, via the at least one wireless interface, at least one of information identifying an access device and information identifying a user. In addition, the gateway may be capable of determining whether updating of the at least one of the plurality of access devices is appropriate, and of receiving updating information, via the broadband network, based upon the at least one of information identifying an access device and information identifying a user. The gateway may also be capable of transferring the received updating information to the at least one of the plurality of access devices via the at least one wireless interface.

Multimedia information in various representative embodiments of the present invention may comprise at least one of streaming video, broadcast video, voice, digital data, text, digitized audio, digitized still images, digitized video, and digitized music. The updating information may comprise at least one of firmware and software, and may also comprise provisioning parameters assigned by an operator of a wireless wide area network. The provisioning parameters may comprise at least one of an international mobile station identifier (IMSI), a mobile identification number (MIN), a system identifier (SID), a security key, a radio frequency operating parameter, an access channel, a control channel, a paging channel, a neighbor list, and access overload class information. In a representative embodiment of the present invention, the wireless wide area network may comprise a cellular network. The at least one wireless interface may be compliant with the Bluetooth V1.2 or compatible personal area network (PAN) specification, may communicate using an unlicensed frequency band, and may communicate at a frequency of approximately 2.4 gigahertz. In addition, the at least one wireless interface may be compliant with at least one of the Institute of Electrical and Electronics Engineers (IEEE) 802.11a, 802.11b, 802.11g, and 802.11n standards. The broadband network may comprise at least one of a digital subscriber line (DSL) network, a cable network, a satellite network, a cellular network, and the Internet. In a representative embodiment of the present invention, the cellular network may comprise at least one of a global system for mobile communications (GSM) network, a time division multiple access (TDMA) network, a code division multiple access (CDMA) network, and a universal mobile telecommunications system (UMTS) network. The information identifying a user may comprise at least one of a member identifier, a user name, an administrative identifier, and a credit card number. The information identifying an access device may comprise at least one of an electronic serial number, an Internet protocol (IP) address, a media access control (MAC) address, information identifying a make of an access device, and information identifying a model of an access device. The plurality of access devices may comprise at least one of a mobile multimedia handset, a personal digital assistant (PDA), a personal computer (PC), a digital scanner, a digital camera, a printer, headphones, and a pointing device.

Other aspects of the present invention may be seen in a method supporting over-the-air programming of a plurality of access devices via a broadband access gateway. Such a method may comprise receiving from at least one of the plurality of access devices, via at least one wireless interface, at least one of information identifying an access device and information identifying a user. A representative embodiment of the present invention may comprise determining whether updating of the at least one of the plurality of access devices is appropriate. The method may also comprise receiving updating information, via a broadband network, based upon the at least one of information identifying an access device and information identifying a user, and transferring the received updating information to the at least one of the plurality of access devices via the at least one wireless interface. A representative embodiment in accordance the present invention may further comprise exchanging multimedia information among the at least one wireless interface and the broadband network.

In a representative embodiment of the present invention, multimedia information may comprise at least one of streaming video, broadcast video, voice, digital data, text, digitized audio, digitized still images, digitized video, and digitized music. The updating information may comprise at least one of firmware and software, and may comprise provisioning parameters assigned by an operator of a wireless wide area network. The provisioning parameters may comprise at least one of an international mobile station identifier (IMSI), a mobile identification number (MIN), a system identifier (SID), a security key, a radio frequency operating parameter, an access channel, a control channel, a paging channel, a neighbor list, and access overload class information, and the wireless wide area network may comprise a cellular network. In a representative embodiment of the present invention, the at least one wireless interface may be compliant with the Bluetooth V1.2 or compatible personal area network (PAN) specification, may communicate using an unlicensed frequency band, and may communicate at a frequency of approximately 2.4 gigahertz. The at least one wireless interface may be compliant with at least one of the Institute of Electrical and Electronics Engineers (IEEE) 802.11a, 802.11b, 802.11g, and 802.11n standards.

The broadband network in a representative embodiment according to the present invention may comprise at least one of a digital subscriber line (DSL) network, a cable network, a satellite network, a cellular network, and the Internet. The cellular network may comprise at least one of a global system for mobile communications (GSM) network, a time division multiple access (TDMA) network, a code division multiple access (CDMA) network, and a universal mobile telecommunications system (UMTS) network. The information identifying a user may comprise at least one of a member identifier, a user name, an administrative identifier, and a credit card number. In addition, the information identifying an access device may comprise at least one of an electronic serial number, an Internet protocol (IP) address, a media access control (MAC) address, information identifying a make of an access device, and information identifying a model of an access device. The plurality of access devices may comprise at least one of a mobile multimedia handset, a personal digital assistant (PDA), a personal computer (PC), a digital scanner, a digital camera, a printer, headphones, and a pointing device.

Yet other aspects of the present invention may be observed in a machine-readable storage, having stored thereon a computer program having a plurality of code sections executable by a machine, for causing the machine to perform the operations of the method described above.

In a representative embodiment of the present invention, the wireless local area networks may include data networks such as, for example, Institute of Electrical and Electronics Engineer (IEEE) 802.11a/b/g/n compliant wireless networks such as those located in homes, hot spots or an office. Such local area networks may operate in unlicensed radio frequency spectrum such as in, for example, the 2.4 and 5 gigahertz regions. Examples of wide area networks may include cellular digital packet data (CDPD), voice and data networks such as public switched telephone networks (PSTN), Global System For Mobile Communication (GSM), GSM General Packet Radio Service (GPRS), GSM Short Message Service (SMS), GSM Enhanced Data Rates For Global Evolution (EDGE), North American Time Division Multiplex Access (TDMA), iDEN, Code Division Multiple Access (CDMA) and CDMA2000 1xRT, Universal Mobile Telecommunications System (UMTS) network, to name only a few.

A personal area network (PAN) may be formed by a plurality of wireless communication access devices such as, for example, mobile multimedia handsets, PDAs, telephones, and computers. Other elements of such a network may, for example, include computer peripherals such as digital scanners, digital cameras, printers, headphones, and pointing devices, that may be located within the immediate proximity of a person. A PAN may be an ad-hoc network of such communication devices. In a representative embodiment of the present invention, access devices within the PAN may communicate with other access devices within the PAN and also with other access devices that are located in other networks accessible via the PAN. The personal area networks may include data networks such as, for example, a Bluetooth compliant network, and Institute of Electrical and Electronics Engineer (IEEE) 802.15.3a compliant wireless networks. Such personal area networks may operate in unlicensed radio frequency spectrum such as, for example, the 2.4 and 5 gigahertz regions. Details of one example of a personal area network are provided in the document "Bluetooth Core Specification V1.2", Nov. 5, 2003, from Bluetooth SIG, Inc., the complete subject matter of which is hereby incorporated herein by reference, in its entirety. For example, in a Bluetooth® wireless PAN, a first Bluetooth®-enabled wireless access device may communicate with a second Bluetooth®-enabled wireless access device within the PAN. Additionally, either of the first and second Bluetooth®-enabled wireless access devices may communicate with the Internet or another LAN or WAN via the Bluetooth® wireless PAN.

In a representative embodiment of the present invention, a gateway may be adapted to provide seamless and transparent communication between a plurality of access devices and a plurality of networks. The functionality of the gateway may be divided, for example, into application content functionality, and configuration and management functionality. The application content functionality may, for example, deal with the types of applications that may be supported by the gateway as well as the various types of data that may be received, processed and/or transmitted by the gateway. In this regard, application content functionality may also include the manner in which other devices and/or systems may utilize data from the gateway.

Content and application services are important because all the information coming into and leaving the home from either the WAN side (i.e., the broadband connection side), or from the PAN side (i.e., the access device side) converges at the gateway. The PAN side may comprise Bluetooth, wireless LAN (IEEE 802.11a/b/g/n), IEEE 802.15.3a ultra-wideband, or cellular, for example. Notwithstanding, the gateway may be adapted to convert, for example, wirelessly received GSM-formatted information into, for example, Internet protocol (IP)-formatted information and in reverse, converts IP-formatted information into wireless GSM-formatted information suitable for over-the-air transmission. Support for other wireless communication protocols such as TDMA, CDMA, and UMTS may also be provided. In a representative embodiment of the present invention, the gateway may comprise suitable circuitry, logic and/or code that may be adapted to receive and process MPEG related data, which may be suitable for display on a screen. The gateway in an embodiment of the present invention functions as a focal point where data converges from a plurality of wired and wireless services. Although, in a particular embodiment of the present invention the gateway may do very little in terms of actual content aggregation, there is virtual aggregation of data. The converged data may be integrated and or otherwise utilized to offer unique opportunities for launching various content and application services from a single strategic location. Since the gateway in an embodiment of the present invention is the focal point where data converges, one or more protocol stacks may be employed for launching the various content and application services.

The gateway in a representative embodiment of the present invention may be adapted to route calls based on established rules that may be programmed into the gateway. For example, the gateway may be governed by a rule which states that local calls are to be routed to an incumbent local exchange carrier (iLEC), while long distance calls are to be handled by Long Distance Carrier Company. Accordingly, when a call originates at the gateway and it is determined that the call is a local call, the gateway may be adapted to route the call to the iLEC. However, if the gateway determines that the call is a long distance call, then the gateway may be adapted to route the call to Long Distance Carrier Company.

A representative embodiment of the present invention may leverage existing broadband infrastructure that is commonly found in many homes and businesses today. Because a consumer is already paying for the use of the broadband infrastructure in their home or office, leveraging the use of the existing broadband infrastructure for communication with wide area networks results in minimal or no communication costs. The broadband infrastructure may be, for example, a cable or DSL infrastructure.

The wireless interface function provided by the gateway located within a home, for example, may be utilized to route or communicate a great deal of traffic to a wired network such as a broadband network or a wireless network such as a GSM or CDMA network via a broadband connection. In other words, the wireless gateway infrastructure provided by a representative embodiment of the present invention provides a scalable network infrastructure that rides on an existing access infrastructure already supplied by a broadband service provider to a home, office or business. Additionally, the scalable infrastructure provided by the gateway also solves the problems associated with signal penetration and propagation, thereby providing improved quality of service (QoS). From a market perspective, a wireless service provider may now have access to the necessary infrastructure to provide improved wireless services to users within a home or office. Accordingly, in order to rapidly increase their growth, wireless service providers may now target that portion of the in-home landline or plain old telephone system (POTS) business, which have traditionally been handled by incumbent local exchange carriers (ILECs) or other LECs.

The unlicensed mobile access gateway described above may possess a significant amount of processing power. The gateways of existing systems fall short of realizing the full potential of the merged wired and wireless communication network that is enabled by a representative embodiment of the present invention. Numerous basic and enhanced communication services may be enabled or provided by the gateway. Support for access devices such as, for example, mobile multimedia handsets and PDAs may be involved in order to utilize these basic and enhanced communication services enabled by the new wave of digital technologies. Current and/or proposed mobile access gateway systems, however, do not provide the range of support needed for their use by the everyday consumer.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system supporting over-the-air programming of a plurality of access devices via a broadband access gateway, the system comprising:
   a gateway communicatively coupled to a broadband network and at least one wireless interface, the gateway selectively communicating multimedia information among the at least one wireless interface and the broadband network, the gateway and the at least one wireless interface forming a local network for communicating with the plurality of access devices via the at least one wireless interface;
   the gateway receiving from at least one of the plurality of access devices, via the at least one wireless interface, one or both of: information identifying an access device or information identifying a user;
   based on the received information identifying the access device or the received information identifying the user, the gateway determining whether updating of software or firmware of the at least one of the plurality of access devices is appropriate;
   the gateway receiving updating information including updated code for software or firmware for operating the at least one of the plurality of access devices, via the broadband network, based upon the one or both of: information identifying an access device or information identifying a user; and
   the gateway transferring the received updating information to the at least one of the plurality of access devices via the at least one wireless interface.

2. The system according to claim 1 wherein multimedia information comprises one or more of: streaming video, broadcast video, voice, digital data, text, digitized audio, digitized still images, digitized video, or digitized music.

3. The system according to claim 1 wherein the updating information comprises provisioning parameters assigned by an operator of a wireless wide area network.

4. The system according to claim 3 wherein the provisioning parameters comprise one or more of: an international mobile station identifier (IMSI), a mobile identification number (MIN), a system identifier (SID); a security key, a radio frequency operating parameter, an access channel, a control channel, a paging channel, a neighbor list, or access overload class information.

5. The system according to claim 3 wherein the wireless wide area network comprises a cellular network.

6. The system according to claim 1 wherein the at least one wireless interface is compliant with the Bluetooth V1.2 or compatible personal area network (PAN) specification.

7. The system according to claim 1 wherein the at least one wireless interface communicates using an unlicensed frequency band.

8. The system according to claim 1 wherein the at least one wireless interface communicates at a frequency of approximately 2.4 gigahertz.

9. The system according to claim 1 wherein the at least one wireless interface is compliant with one or more of: the Institute of Electrical and Electronics Engineers (IEEE) 802.11a, 802.11b, 802.11g, or 802.11n standards.

10. The system according to claim 1 wherein the broadband network comprises one or more of: a digital subscriber line (DSL) network, a cable network, a satellite network, a cellular network, or the Internet.

11. The system according to claim 10 wherein the cellular network comprises one or more of: a global system for mobile communications (GSM) network, a time division multiple access (TDMA) network, a code division multiple access (CDMA) network, or a universal mobile telecommunications system (UMTS) network.

12. The system according to claim 1 wherein the information identifying a user comprises one or more of: a member identifier, a user name, an administrative identifier, or a credit card number.

13. The system according to claim 1 wherein the information identifying an access device comprises one or more of: an electronic serial number, an Internet protocol (IP) address, a media access control (MAC) address, information identifying a make of an access device, or information identifying a model of an access device.

14. The system according to claim 1 wherein the plurality of access devices comprises one or more of: a mobile multimedia handset, a personal digital assistant (PDA), a personal computer (PC), a digital scanner, a digital camera, a printer, headphones, or a pointing device.

15. A method supporting over-the-air programming of a plurality of access devices via a broadband access gateway, the method comprising:
forming, with the broadband access gateway and at least one wireless interface, one or more local networks for communicating with network access devices;
receiving from at least one of the plurality of access devices, via the at least one wireless interface, one or both of: information identifying an access device or information identifying a user;
based on the received information identifying the access device or the received information identifying the user, determining whether updating of software or firmware of the at least one of the plurality of access devices is appropriate;
receiving updating information including updated code for software or firmware for operating the at least one of the plurality of access devices, via a broadband network, based upon the one or both of: information identifying an access device or information identifying a user; and
transferring the received updating information to the at least one of the plurality of access devices via the at least one wireless interface.

16. The method according to claim 15 further comprising: communicating multimedia information among the at least one wireless interface and the broadband network.

17. The method according to claim 15 wherein multimedia information comprises one or more of: streaming video, broadcast video, voice, digital data, text, digitized audio, digitized still images, digitized video, or digitized music.

18. The method according to claim 15 wherein the updating information comprises provisioning parameters assigned by an operator of a wireless wide area network.

19. The method according to claim 18 wherein the provisioning parameters comprise one or more of: an international mobile station identifier (IMSI), a mobile identification number (MIN), a system identifier (SID); a security key, a radio frequency operating parameter, an access channel, a control channel, a paging channel, a neighbor list, or access overload class information.

20. The method according to claim 18 wherein the wireless wide area network comprises a cellular network.

21. The method according to claim 15 wherein the at least one wireless interface is compliant with the Bluetooth V1.2 or compatible personal area network (PAN) specification.

22. The method according to claim 15 wherein the at least one wireless interface communicates using an unlicensed frequency band.

23. The method according to claim 15 wherein the at least one wireless interface communicates at a frequency of approximately 2.4 gigahertz.

24. The method according to claim 15 wherein the at least one wireless interface is compliant with one or more of: the Institute of Electrical and Electronics Engineers (IEEE) 802.11a, 802.11b, 802.11g, or 802.11n standards.

25. The method according to claim 15 wherein the broadband network comprises one or more of: a digital subscriber line (DSL) network, a cable network, a satellite network, a cellular network, or the Internet.

26. The method according to claim 25 wherein the cellular network comprises one or more of: a global system for mobile communications (GSM) network, a time division multiple access (TDMA) network, a code division multiple access (CDMA) network, or a universal mobile telecommunications system (UMTS) network.

27. The method according to claim 15 wherein the information identifying a user comprises one or more of: a member identifier, a user name, an administrative identifier, or a credit card number.

28. The method according to claim 15 wherein the information identifying an access device comprises one or more of: an electronic serial number, an Internet protocol (IP) address, a media access control (MAC) address, information identifying a make of an access device, or information identifying a model of an access device.

29. The method according to claim 15 wherein the plurality of access devices comprises one or more of: a mobile multimedia handset, a personal digital assistant (PDA), a personal computer (PC), a digital scanner, a digital camera, a printer, headphones, or a pointing device.

30. A non-transitory computer-readable medium, encoded with a computer program having a plurality of code sections for operating a gateway supporting over-the-air programming of a plurality of access devices via a broadband access gateway, the code sections executable by a computer for causing the computer to perform the operations comprising:
forming, with the broadband access gateway and at least one wireless interface, one or more local networks for communicating with network access devices;
receiving from at least one of the plurality of access devices, via at least one wireless interface, one or both of: information identifying an access device or information identifying a user;
based on the received information identifying the access device or the received information identifying the user, determining whether updating of software or firmware of the at least one of the plurality of access devices is appropriate;
receiving updating information including updated code for software or firmware for operating the at least one of the plurality of access devices, via a broadband network, based upon the one or both of: information identifying an access device and/or or information identifying a user; and
transferring the received updating information to the at least one of the plurality of access devices via the wireless interface.

31. The non-transitory computer-readable medium according to claim 30 wherein the code sections executable by a computer further causing the computer to perform the operations comprising:
communicating multimedia information among the at least one wireless interface and the broadband network.

32. The non-transitory computer-readable medium according to claim 30 wherein multimedia information comprises one or more of:
streaming video, broadcast video, voice, digital data, text, digitized audio, digitized still images, digitized video, or digitized music.

33. The non-transitory computer-readable medium according to claim 30 wherein the updating information comprises provisioning parameters assigned by an operator of a wireless wide area network.

34. The non-transitory computer-readable medium according to claim 33 wherein the provisioning parameters comprise one or more of: an international mobile station identifier (IMSI), a mobile identification number (MIN), a system identifier (SID); a security key, a radio frequency operating parameter, an access channel, a control channel, a paging channel, a neighbor list, or access overload class information.

35. The non-transitory computer-readable medium according to claim 33 wherein the wireless wide area network comprises a cellular network.

36. The non-transitory computer-readable medium according to claim 30 wherein the at least one wireless interface is compliant with the Bluetooth V1.2 or compatible personal area network (PAN) specification.

37. The non-transitory computer-readable medium according to claim 30 wherein the at least one wireless interface communicates using an unlicensed frequency band.

38. The non-transitory computer-readable medium according to claim 30 wherein the at least one wireless interface communicates at a frequency of approximately 2.4 gigahertz.

39. The non-transitory computer-readable medium according to claim 30 wherein the at least one wireless interface is compliant with one or more of: the Institute of Electrical and Electronics Engineers (IEEE) 802.11a, 802.11b, 802.11g, or 802.11n standards.

40. The non-transitory computer-readable medium according to claim 30 wherein the broadband network comprises one or more of: a digital subscriber line (DSL) network, a cable network, a satellite network, a cellular network, or the Internet.

41. The non-transitory computer-readable medium according to claim 40 wherein the cellular network comprises one or more of: a global system for mobile communications (GSM) network, a time division multiple access (TDMA) network, a code division multiple access (CDMA) network, or a universal mobile telecommunications system (UMTS) network.

42. The non-transitory computer-readable medium according to claim 30 wherein the information identifying a user comprises one or more of: a member identifier, a user name, an administrative identifier, or a credit card number.

43. The non-transitory computer-readable medium according to claim 30 wherein the information identifying an access device comprises one or more of: an electronic serial number, an Internet protocol (IP) address, a media access control (MAC) address, information identifying a make of an access device, or information identifying a model of an access device.

44. The non-transitory computer-readable medium according to claim 30 wherein the plurality of access devices comprises one or more of:
   a mobile multimedia handset, a personal digital assistant (POA), a personal computer (PC), a digital scanner, a digital camera, a printer, headphones, or a pointing device.

45. A system supporting over-the-air programming of a plurality of access devices via a broadband access gateway, the system comprising:
   an access device that transmits one or both of information identifying the access device or information identifying a user to a gateway, the access device receiving updating information including updated code for software or firmware for operating the access device when a gateway uses the transmitted information identifying the access device or the information identifying the user to the gateway to determine the update is appropriate, the updating information updating software or firmware of the access device.

46. The system according to claim 45 wherein the updating information comprises provisioning parameters assigned by an operator of a wireless wide area network.

47. The system according to claim 46 wherein the provisioning parameters comprise one or more of: an international mobile station identifier (IMSI), a mobile identification number (MIN), a system identifier (SID); a security key, a radio frequency operating parameter, an access channel, a control channel, a paging channel, a neighbor list, or access overload class information.

* * * * *

UNITED STATES PATENT AND TRADEMARK OFFICE
CERTIFICATE OF CORRECTION

PATENT NO.        : 8,630,225 B2
APPLICATION NO.   : 11/096052
DATED             : January 14, 2014
INVENTOR(S)       : Karaoguz et al.

Page 1 of 1

It is certified that error appears in the above-identified patent and that said Letters Patent is hereby corrected as shown below:

In the Claims

Column 28, claim 30, line 44, before "identifying a", replace "device and/or or information" with --device or information--.

Signed and Sealed this
Twenty-seventh Day of May, 2014

Michelle K. Lee
*Deputy Director of the United States Patent and Trademark Office*